United States Patent
Elgersma et al.

(10) Patent No.: US 11,609,093 B2
(45) Date of Patent: Mar. 21, 2023

(54) POSITION PROBABILITY DENSITY FUNCTION FILTER TO DETERMINE REAL-TIME MEASUREMENT ERRORS FOR MAP BASED, VISION NAVIGATION SYSTEMS

(71) Applicant: Honeywell International Inc., Charlotte, NC (US)

(72) Inventors: Michael Ray Elgersma, Plymouth, MN (US); Vibhor L Bageshwar, Rosemount, MN (US)

(73) Assignee: Honeywell International Inc., Charlotte, NC (US)

( * ) Notice: Subject to any disclaimer, the term of this patent is extended or adjusted under 35 U.S.C. 154(b) by 71 days.

(21) Appl. No.: 17/340,921

(22) Filed: Jun. 7, 2021

(65) Prior Publication Data

US 2022/0390237 A1    Dec. 8, 2022

(51) Int. Cl.
    *G01C 21/16*    (2006.01)
    *G01C 21/00*    (2006.01)
    (Continued)

(52) U.S. Cl.
    CPC ........ *G01C 21/1656* (2020.08); *B64C 39/024* (2013.01); *G01C 21/387* (2020.08);
    (Continued)

(58) Field of Classification Search
    CPC .......................... G01S 5/0294; G01G 1/0052
    See application file for complete search history.

(56) References Cited

U.S. PATENT DOCUMENTS

2012/0022784 A1    1/2012 Louis et al.
2016/0167750 A1    6/2016 Napolitano
(Continued)

FOREIGN PATENT DOCUMENTS

CN    110146909 A    8/2019
EP    2133662 A2    12/2009
(Continued)

OTHER PUBLICATIONS

Georges, Hassana; Xiao, Zhu; Wang, Dong; "Hybrid Cooperative Vehicle Position Using Distributed Randomized Sigma Point Belief Propagation on Non-Gaussian Noise Distribution"; IEEE Sensors Journal vol. 16 (Year: 2016).*

(Continued)

*Primary Examiner* — Vivek D Koppikar
*Assistant Examiner* — Godfrey Aleksander Maciorowski
(74) *Attorney, Agent, or Firm* — Fogg & Powers LLC

(57) ABSTRACT

A navigation system for a vehicle comprises onboard sensors including a vision sensor, and an onboard map database of terrain maps. An onboard processer, coupled to the sensors and map database, includes a position PDF filter, which performs a method comprising: receiving image data from the vision sensor corresponding to terrain images captured by the vision sensor of a given area; receiving map data from the map database corresponding to a terrain map of the area; generating a first PDF of image features in the image data; generating a second PDF of map features in the map data; generating a measurement vector PDF by a convolution of the first PDF and second PDF; estimating a position vector PDF using a non-linear filter that receives the measurement vector PDF; and generating statistics from the estimated position vector PDF that include real-time measurement errors of position and angular orientation of the vehicle.

20 Claims, 16 Drawing Sheets

(51) Int. Cl.
*G06T 7/277* (2017.01)
*G06K 9/62* (2022.01)
*B64C 39/02* (2023.01)

(52) U.S. Cl.
CPC ....... *G01C 21/3848* (2020.08); *G06K 9/6226* (2013.01); *G06K 9/6296* (2013.01); *G06T 7/277* (2017.01); *B64C 2201/141* (2013.01); *G06V 2201/07* (2022.01)

(56) References Cited

U.S. PATENT DOCUMENTS

| | | |
|---|---|---|
| 2017/0345166 A1 | 11/2017 | Polle |
| 2018/0095476 A1* | 4/2018 | Madsen .............. A01B 69/001 |
| 2018/0120122 A1 | 5/2018 | Laine et al. |
| 2018/0165591 A1 | 6/2018 | Dunik et al. |
| 2020/0349362 A1 | 11/2020 | Maloney |

FOREIGN PATENT DOCUMENTS

| | | |
|---|---|---|
| EP | 3343431 A1 | 7/2018 |
| KR | 101737950 B1 | 5/2017 |
| KR | 102026114 B1 | 9/2019 |
| WO | 2020109471 A1 | 6/2020 |

OTHER PUBLICATIONS

Challa et al., "Nonlinear Filter Design Using Fokker-Planck-Kolmogorov Probability Density Evolutions", IEEE Transactions on Aerospace and Electronic Systems, Jan. 2000, pp. 310 through 315, vol. 36, No. 1, IEEE.

Chirikjian et al., "Stochastic Models, Information Theory, and Lie Groups, vol. 1: Classical Results and Geometric," Birkhauser, 2009, pp. 1 through 395, Springer Science+ Business Media, LLC.

Chirikjian et al., "Stochastic Models, Information Theory, and Lie Groups, vol. 2: Analytic Methods and Modern Applications," Birkhauser, 2012, pp. 362 through 369, Springer Science+ Business Media, LLC.

Delgado-Bonal et al., "Human vision is determined based on information theory", Scientific Reports, Nov. 3, 2016, pp. 1 through 5, www.nature.com/scientificreports.

Hu et al., "Method for Measuring the Information Content of Terrain from Digital Elevation Models", Entropy, 17, pp. 7021 through 7051, Oct. 2015, www.mdpi.com/journal/entropy.

Kumar et al., "A Nonlinear Filter Based on Fokker-Planck Equation", American Control Conference, Jun. 30-Jul. 2, 2010, pp. 3136 through 3141, AACC.

Kumar et al., "The Partition of Unity Finite Element Approach to the Stationary Fokker-Planck Equation", AIAA/AAS Astrodynamics Specialist Conference and Exhibit, Aug. 2006, pp. 1 through 16, AIAA.

Reddy et al., "An FFT -Based Technique for Translation, Rotation, and Scale-Invariant Image Registration", IEEE Transactions on Image Processing, Aug. 1996, pp. 1266 through 1271, vol. 5, No. 8, IEEE.

Schwarz et al., "The use of FFT techniques in physical geodesy", Geophys. J. Int. 100, 1990, pp. 485 through 514.

Bageshwar et al., "Integrity of Range Measurements", U.S. Appl. No. 17/237,841, filed Apr. 22, 2021, pp. 1-44.

Bageshwar, Vibhor L. et al., "Integrity Monitoring of Vehicle Kinematic States Using Map-Based, Vision Navigation Systems", U.S. Appl. No. 17/380,916, filed Jul. 20, 2021, pp. 1 through 46, Published: US.

Elgersma Michael R. et al., "Method and System for Planning Vehicle Trajectories by Enhancing En Route Navigation Performance", U.S. Appl. No. 17/350,959, filed Jun. 17, 2021, pp. 1 through 35, Published: US.

European Patent Office, "Extended European Search Report", from EP Application No. 22175937.6, from Foreign Counterpart to U.S. Appl. No. 17/340,921, dated Nov. 16, 2022, pp. 1 through 11, Published: EP.

\* cited by examiner

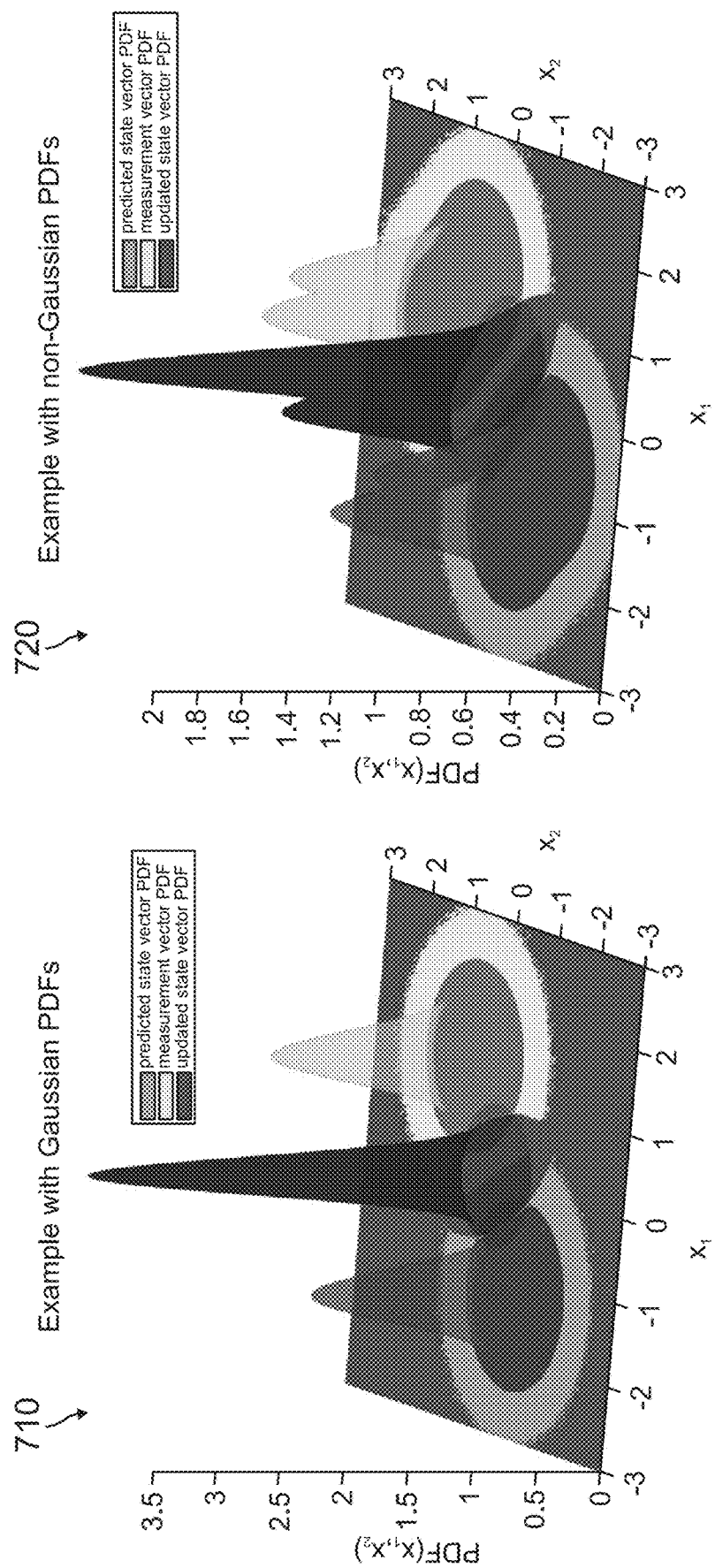

./edges/1576013862.0 cam
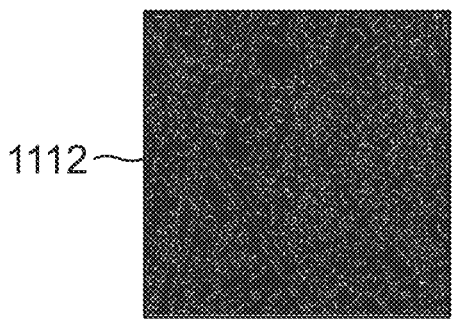
1112
./edges/1576013870.31 cam
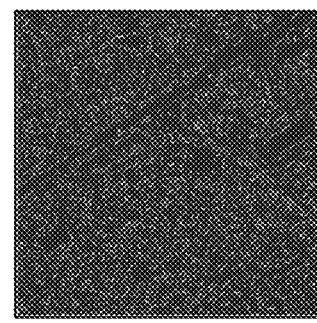
1113
./edges/1576013862.0 map
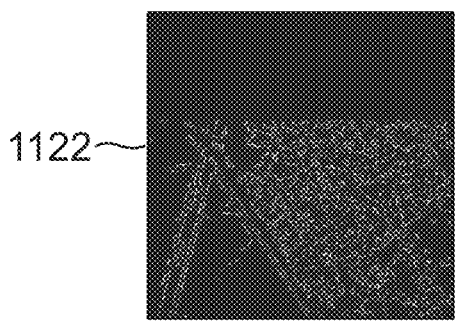
1122
./edges/1576013870.31 map
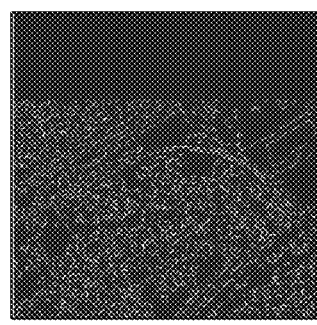
1123
$PDF_{meas} = conv(cam, map)$
$Mean(PDF_{meas}) = [5e+02; -1.9e+02]$
$COV^{1/2} = [279.6 -5.773; -5.773\ 440.3]$
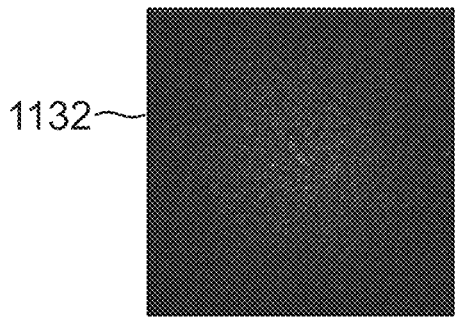
1132
$PDF_{meas} = conv(cam, map)$
$Mean(PDF_{meas}) = [2.8e+02; -1.2e+02]$
$COV^{1/2} = [370.2\ 187.8; 187.8\ 436.7]$
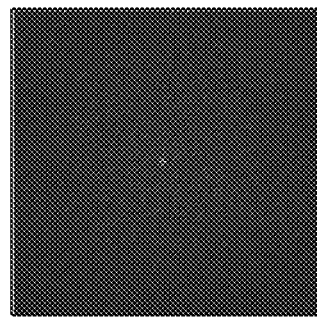
1133
$PDF_{k+1} = PDF_{k} \cdot PDF_{meas}$
$Mean(PDF_{k+1}) = [-12; -0.77]$
$COV^{1/2} = [255\ 0.606; 0.606\ 259]$
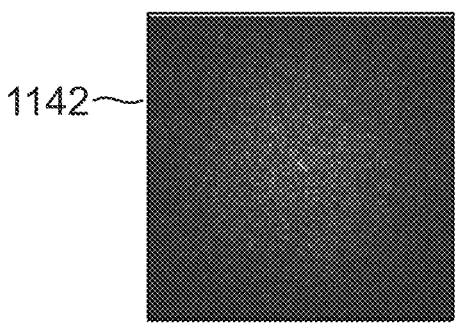
1142
$PDF_{k+1} = PDF_{k} \cdot PDF_{meas}$
$Mean(PDF_{k+1}) = [-21; -0.58]$
$COV^{1/2} = [220\ -0.93; -0.93\ 226]$
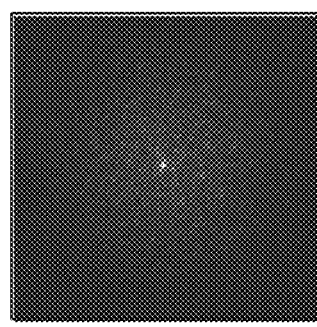
1143
FIG. 11A ./edges/1576013877.31 cam
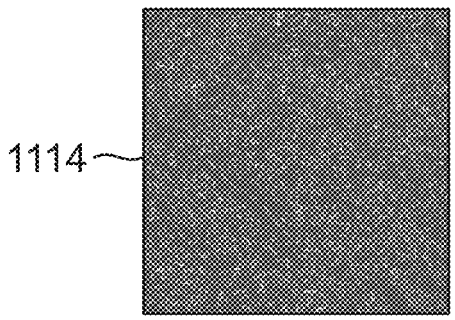
./edges/1576013881.71 cam
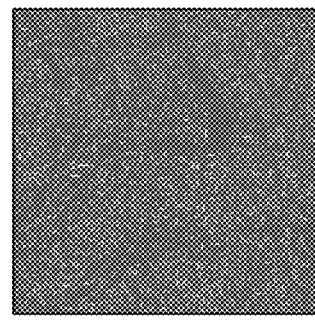
./edges/1576013877.31 map
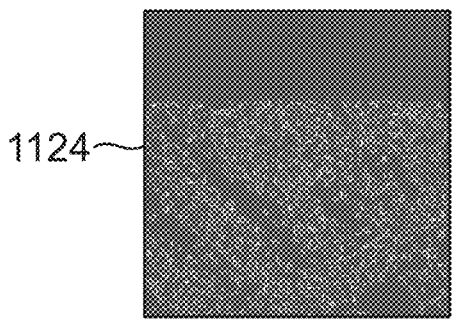
./edges/1576013881.71 map
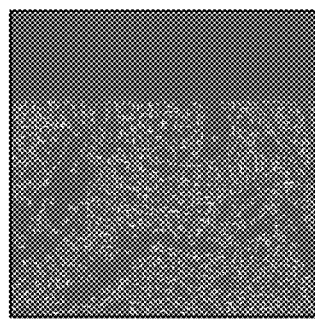
$PDF_{meas} = conv(cam, map)$
$Mean(PDF_{meas}) = [1.7e+02; -3.5e+02]$
$COV^{1/2} = [420\ 112.1; -112.1\ 325]$
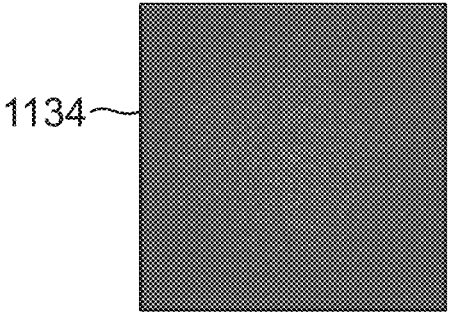
$PDF_{meas} = conv(cam, map)$
$Mean(PDF_{meas}) = [2.8e+02; 3.1e+02]$
$COV^{1/2} = [290.6\ -218.2; -218.2\ 316.2]$
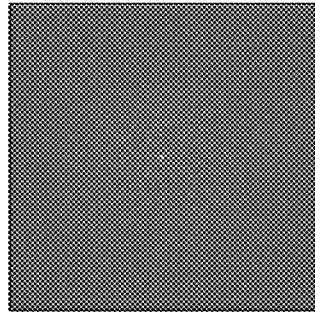
$PDF_{k+1} = PDF_{k^-} * PDF_{meas}$
$Mean(PDF_{k+1}) = [-20; -1.2]$
$COV^{1/2} = [188\ -0.266; -0.266\ 194]$
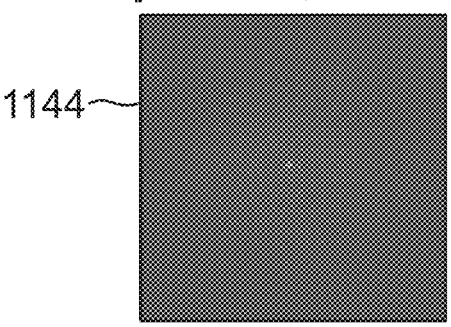
$PDF_{k+1} = PDF_{k^-} * PDF_{meas}$
$Mean(PDF_{k+1}) = [-19; -2.8]$
$COV^{1/2} = [156\ 0.339; 0.339\ 163]$
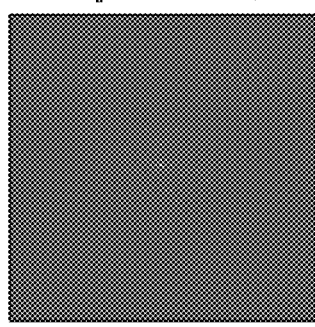
FIG. 11B ./edges/1576013885.81 cam
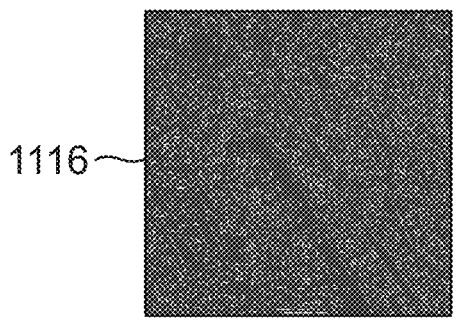
./edges/1576013890.01 cam
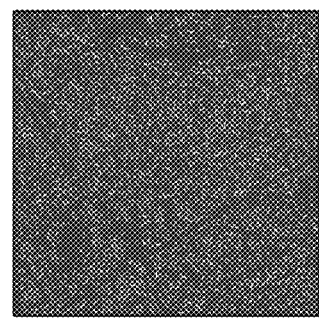
./edges/1576013885.81 map
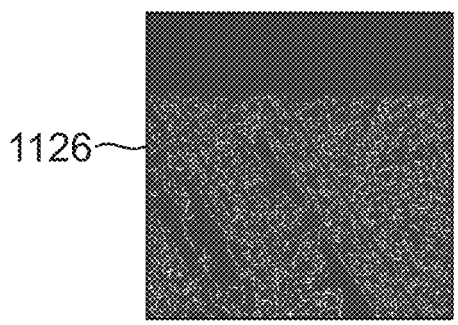
./edges/1576013890.01 map
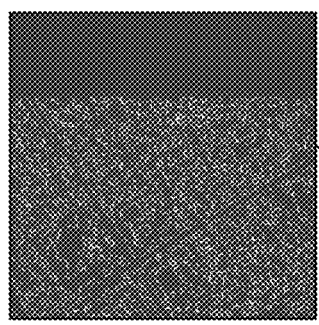
$PDF_{meas} = conv(cam, map)$
$Mean(PDF_{meas}) = [3.2e+02; 2.8e+02]$
$COV^{1/2} = [323.7\ 83.21; 83.21\ 390.3]$
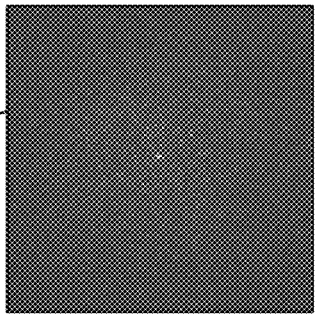
$PDF_{meas} = conv(cam, map)$
$Mean(PDF_{meas}) = [2.1e+02; -2.6e+02]$
$COV^{1/2} = [387.6\ 116; 116\ 316.6]$
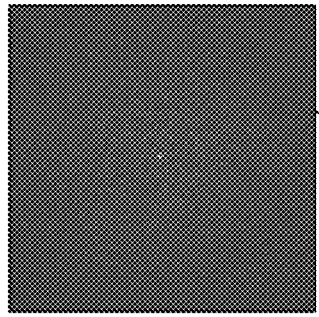
$PDF_{k+1} = PDF_k \cdot PDF_{meas}$
$Mean(PDF_{k+1}) = [-18; -2.6]$
$COV^{1/2} = [126\ 0.581; 0.581\ 132]$
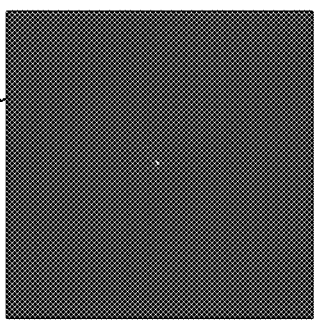
$PDF_{k+1} = PDF_k \cdot PDF_{meas}$
$Mean(PDF_{k+1}) = [-13; -3.9]$
$COV^{1/2} = [86\ 0.726; 0.726\ 89.4]$
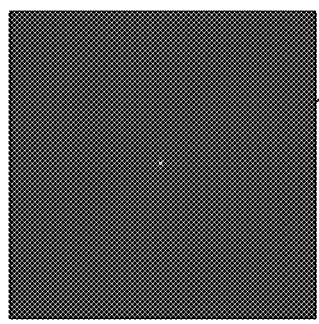
FIG. 11C ./edges/1576013893.11 cam
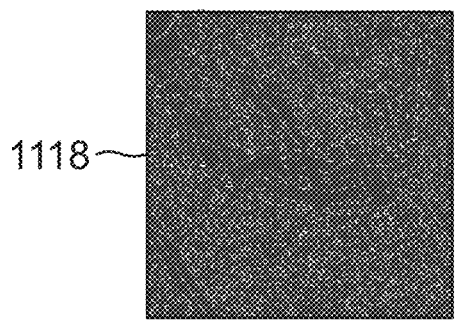
./edges/1576013897.51 cam
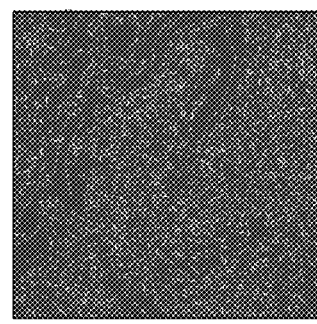
./edges/1576013893.11 map
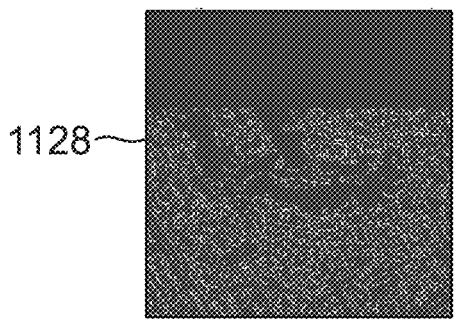
./edges/1576013897.51 map
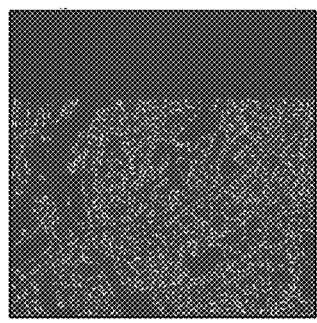
$PDF_{meas} = conv(cam, map)$
$Mean(PDF_{meas}) = [4e+02; -49]$
$COV^{1/2} = [230.4 -79.08; -79.08\ 480.5]$
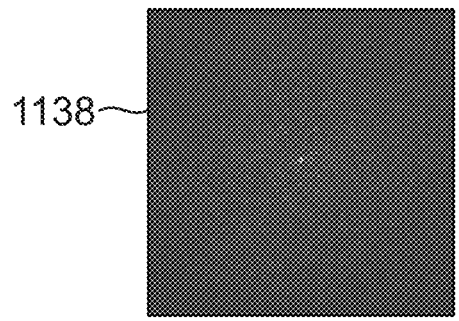
$PDF_{meas} = conv(cam, map)$
$Mean(PDF_{meas}) = [2.4e+02; -1.6e+02]$
$COV^{1/2} = [385.5\ 61.13; 61.13\ 456.2]$
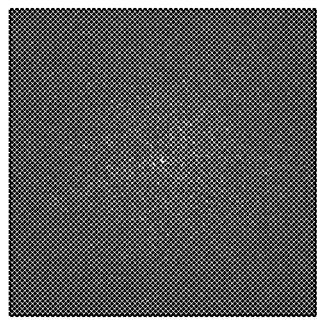
$PDF_{k+1} = PDF_k \cdot PDF_{meas}$
$Mean(PDF_{k+1}) = [-9.9; -3.8]$
$COV^{1/2} = [46.3\ 0.226; 0.226\ 48.6]$
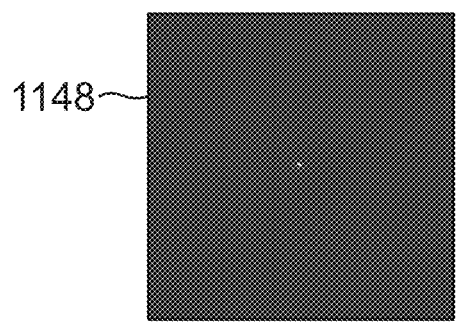
$PDF_{k+1} = PDF_k \cdot PDF_{meas}$
$Mean(PDF_{k+1}) = [-7.9; -3.3]$
$COV^{1/2} = [25\ 0.132; 0.132\ 26.2]$
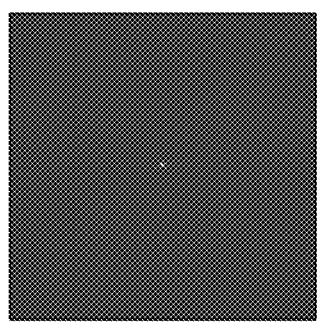
FIG. 11D

POSITION PROBABILITY DENSITY FUNCTION FILTER TO DETERMINE REAL-TIME MEASUREMENT ERRORS FOR MAP BASED, VISION NAVIGATION SYSTEMS

BACKGROUND

A typical method of vehicle navigation in Global Navigation Satellite System (GNSS) denied environments is to use map based, vision navigation systems to estimate the kinematic states, including position and angular orientation, of the vehicle. Such map based, vision navigation systems typically use vision sensors such as cameras located on the vehicle to collect images of the ground, and correlate the images with pre-existing maps to navigate the vehicle. The correlated images provide relative position and angular orientation measurements of the vision sensors, and therefore the vehicle, relative to the map. These measurements are fused by a navigation filter, typically a Bayesian filter, with measurements of other sensors to estimate the vehicle's position and angular orientation relative to the map. If the navigation system is given the transformations of the map's position and angular orientation relative to a known reference frame, then the navigation filter's estimates of the vehicle's kinematic states can be resolved in the known reference frame.

Some map based, vision navigation systems can be used for aircraft operating at different altitudes, such as air taxis in urban air mobility applications, as well as high-altitude missiles and munitions. However, a limitation with such navigation systems is that they do not compute real-time errors of the position and angular orientation measurements from the correlated images. These measurement errors are often pre-selected and scheduled depending on the intended operational environment. Such an approach suffers because: position and angular orientation errors vary according to the available features in changing visual environments; the intended vehicle path can be operationally changed; and sensors can be changed in the field prior to vehicle operation. The resulting navigation filter performance is inconsistent because the pre-selected measurement errors do not accurately capture the actual measurement errors. Further, downstream systems and users do not have accurate statistics indicating the true performance of the navigation filter, leading the downstream systems and users to rely on inaccurate vehicle navigation statistics.

SUMMARY

A navigation system comprises a plurality of sensors onboard a vehicle, with the sensors including at least one vision sensor, and a data storage unit onboard the vehicle, with the data storage unit including a map database comprising one or more terrain maps. A processer onboard the vehicle is operatively coupled to the sensors and the data storage unit. The processor includes a position probability density function (PDF) filter, which is operative to perform a method comprising: receiving image data from the at least one vision sensor, the image data corresponding to one or more terrain images, captured by the vision sensor, of a given area; receiving map data from the map database, the map data corresponding to a terrain map of the given area; generating a first PDF of one or more image features available in the image data; generating a second PDF of one or more map features available in the map data; generating a measurement vector PDF by a convolution of the first PDF and the second PDF; estimating a position vector PDF using a non-linear filter that receives the measurement vector PDF; and generating statistics from the estimated position vector PDF, the statistics including real-time measurement errors of position and angular orientation of the vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 7A is an exemplary plot of Gaussian PDFs, in which an updated state vector PDF is equal to a predicted state vector PDF convoluted with a measurement vector PDF, and then normalized;

FIG. 7B is an exemplary plot of general (non-Gaussian) PDFs, in which an updated state vector PDF is equal to a predicted state vector PDF convoluted with a measurement vector PDF, and then normalized;

FIGS. 11A-11D show camera edge images, map edge images, measurement vector PDF plots, and updated position vector PDF plots that were generated during operation of the position PDF filter, while the aircraft was flown according to the flight path shown in FIG. 10;

DETAILED DESCRIPTION

Figure 1:
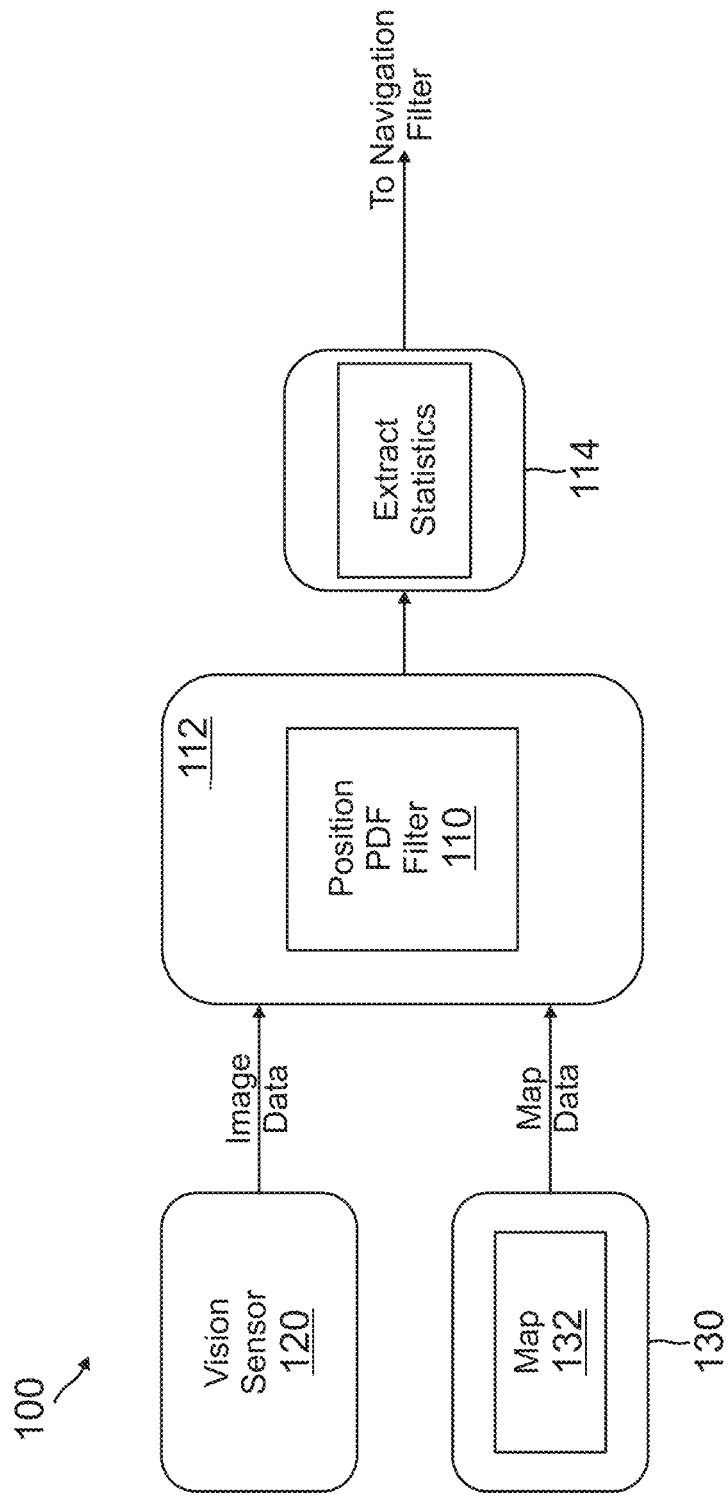
FIG. 1 is a block diagram of a system for use in vehicle navigation, which implements a position probability density function (PDF) filter, according to an exemplary embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A statistical approach for determining real-time measurement errors for map based, vision navigation systems is described herein. The present approach determines real-time errors of the measurements computed by correlating features extracted from vision sensor measurements and features from a map by use of a position probability density function (PDF) filter, which is a nonlinear filter.

This statistical approach is particularly advantageous when using map based, vision navigation systems in GNSS denied environments, because such systems can use real-time position and angular orientation measurement errors in a navigation filter, and can address the limitations of pre-selected, gain scheduled measurement errors in navigation filters such as those mentioned previously. The present approach is different from prior methods, in that it estimates the entire position PDF of the vision sensor, and therefore the vehicle, relative to the map and computes real-time measurement errors of a vehicle's position and angular orientation.

INTRODUCTION

The performance of map based, vision navigation systems depends on their ability to use terrain features to estimate a vehicle's position and angular orientation. The typical approach to selecting position and angular orientation measurement errors uses the following process. Several flight tests over multiple types of terrain are conducted that compare the vision system's position and angular orientation measurements to the true position and angular orientation. For example, sensor measurements of the ground are correlated with pre-existing maps of the same ground area to determine position and angular orientation measurements. A statistical analysis is then conducted to identify the largest position and angular orientation measurement errors (standard deviation) in different ground terrains. The largest position and angular orientation measurement errors for different ground terrains are either used directly or inflated to be used in navigation filters. In real-time applications, the measurement errors are pre-selected based on ground terrain, weather conditions, and the sensor performance characteristics.

Further, the typical approach fuses the position and angular orientation statistics with measurements from other sensors, such as an inertial measurement unit (IMU) or other aiding sensors, using a Kalman filter. The Kalman filter estimates the kinematic states of a vehicle under the assumption that the statistics of the kinematic states can be described using Gaussian probability density functions (PDFs). In effect, the Kalman filter only uses the first moment and second central moment of the sensor measurement statistics to estimate the first moment and second central moment of the statistics of the vehicle's kinematic states. The limitations of this approach are: 1) higher order moments of the position and angular orientation statistics computed from the feature PDF correlation with the map are ignored because only the first two moments of the feature PDF correlation are used by the Kalman filter; and 2) the constant measurement (error) covariance matrices do not reflect changing terrains, weather patterns, changing sensor performance characteristics, and do not reflect current feature availability. As a result, the Kalman filter estimates of the vehicle kinematic state statistics, or Kalman filter performance, are limited.

In the present statistical approach, a position PDF filter estimates the real-time position and angular orientation measurement errors for map-based, vision navigation systems, and the higher order moments of the position and angular orientation measurement statistics. The position PDF filter generally functions as follows.

A first PDF of image features is generated from image data obtained by a vision measurement of an area of the ground, and a second PDF of map features is generated from map data of the same area. The PDFs of the image features and map features refer to the likelihood that a region of the measurement or map contains a feature and statistically outlines the shape of the feature. A position PDF can be selected in a variety of ways, and contains all the moments of the PDF, as no approximations are made. The position PDF is estimated using a non-linear, Bayesian filter, such as a Fokker-Planck filter, which estimates statistics using prediction and update steps. For example, an update step is conducted using a convolution of the PDF measured by the vision sensor and the PDF of the map. The position PDF contains the statistics of the vehicle's position and angular orientation and it is a function of the real-time images. These statistics include the real-time measurement errors of the vehicle's position and angular orientation. These statistics are then fed to a navigation filter for integration with measurements from an IMU and/or additional aiding sensors.

Further details related to the implementation of the position PDF filter to determine real-time measurement errors for a map based, vision navigation system in a vehicle, is described hereafter.

Navigation Filter and Vehicle Kinematic States

As a vehicle such as an aircraft travels along a path, a vision sensor such as a camera mounted on the vehicle can view the terrain below the vehicle. Comparing an image from the camera to a stored-map image, allows computation of the vehicle's kinematic state statistics, including position and angular orientation with respect to the map, for use in a navigation filter.

A Probability Density Function (PDF) gives the probability of how the camera image needs to be shifted in [East, North], to match the camera image with the map image. In addition, image scale and rotation can also be computed. The PDF typically has multiple peaks since similar landmarks give several possible alignments where the images match. These peaks correspond to multiple possible positions for the vehicle. As time goes on, the camera/map alignment for the true position remains consistent, while other peaks that are not consistent (false positions) need to be filtered out.

Covariance: Error of Vehicle Kinematic States Measurements/Estimates

The covariance of navigation measurements relates to the error in a vehicle's kinematic states measurements or estimates. In this context, the navigation covariance is equal to the inverse of information. This means that the more information (feature content) there is in an image, the smaller the covariance (or errors); whereas the less amount of information there is in an image, the larger the covariance. There are various factors that affect the covariance of navigation measurements. For example, the navigation covariance can depend on available information such as landmark features, terrain features, geometry of the features, location of the features, vehicle altitude, edge pixels, and the like. This information can be identified by mean (first moment), covariance (second moment), higher-order moments, or raw edge pixels of an image.

Techniques such as scale invariant feature transform (SIFT) and speeded up robust feature (SURF) can be used to provide scale and rotation invariant features. Sensors such as electro-optical (EO) or infrared (IR) sensors can be used to save terrain features from four seasons of the year. While pixel edges are invariant to the season of the year, camera wavelength sensitivity can be provided by EO/IR sensors. Other information can be density of landmarks, contrast of landmarks, invariance of landmarks to seasons, cloud cover, etc. The variable density of landmarks can result in landmark sparseness in some regions for choosing a route. The terrain type can include forest, rural, urban, desert, ocean, and the like.

Other factors that affect the covariance of navigation measurements can include the flight path of an aircraft, including speed, attitude, and altitude of the aircraft along the flight path, and camera mounting angle, which affect the camera field of view (FOV). Other factors include pixel size on ground, camera contrast, and camera resolution. The camera resolution, contrast, diffraction, EO/IR, can all affect image quality. The camera lens FOV and camera mounting angle affect what the camera views. In addition, other sensors such an IMU need to maintain a navigation solution during times when no landmarks are visible.

Position PDF Filter System and Method

FIG. 1 illustrates a system 100 for use in vehicle navigation, according to an exemplary embodiment, which can implement the present statistical approach. The system 100 includes a position PDF filter 110, which is implemented in a processor 112 onboard a vehicle, such as an aircraft. The processor 112 is operatively coupled to at least one vision sensor 120, such as a camera, which is mounted on the vehicle. The processor 112 is also operatively coupled to a data storage unit 130 onboard the vehicle. The data storage unit 130 includes a map database 132 that stores various terrain maps.

The position PDF filter 110 is operative to receive image data from vision sensor 120 through processor 112. The image data corresponds to terrain images captured by vision sensor 120 of a given area over which the vehicle traverses. The position PDF filter 110 is also operative to receive map data from map database 132 through processor 112, with the map data corresponding a terrain map of the given area.

The position PDF filter 110 is operative to generate statistics of the position and angular orientation of the vehicle, based on correlation of the image data and map data. The statistics include a mean and variance of the image/map correlation and the variance comprises real-time measurement errors of the position and angular orientation. The statistics generated by position PDF filter 110 are extracted by a processing unit 114. As described further hereafter, the extracted statistics are sent to a navigation filter to fuse with measurements from other sensors onboard the vehicle, to estimate the position and angular orientation of the vehicle relative to the terrain map.

Figure 2:
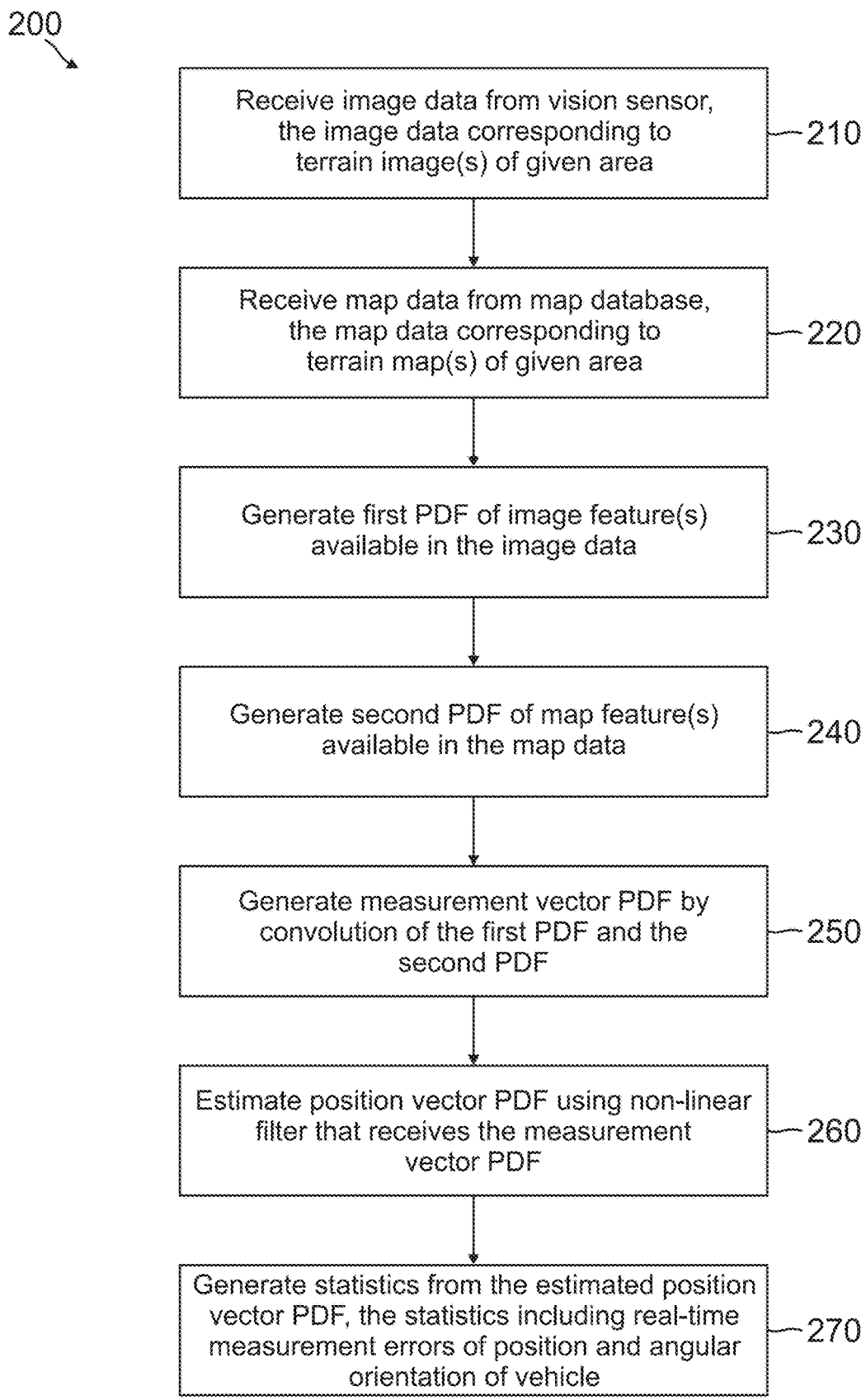
FIG. 2 is a flow diagram of an operational method of a position PDF filter, according to an exemplary implementation.

FIG. 2 is a flow diagram of an operational method 200 of a position PDF filter, such as position PDF filter 110, according to an exemplary implementation. In method 200, the position PDF filter receives image data from a vision sensor, such as vision sensor 120 (e.g., camera) mounted on a vehicle, with the image data corresponding to one or more terrain images captured by the vision sensor of a given area (block 210). The position PDF filter also receives map data from a map database, such as map database 132, with the map data corresponding to one or more terrain maps of the given area (block 220). The method 200 generates a first PDF of one or more image features available in the image data (block 230), and generates a second PDF of one or more map features available in the map data (block 240). The method 200 then generates a measurement vector PDF by a convolution operation of the first PDF and the second PDF (block 250). Thereafter, method 200 estimates a position vector PDF using a non-linear filter, such as a Fokker-Planck filter, which receives the measurement vector PDF (block 260). The method 200 then generates statistics from the estimated position vector PDF, with the statistics including real-time measurement errors of position and angular orientation of the vehicle.

Map Based, Vision Navigation System

Figure 3:
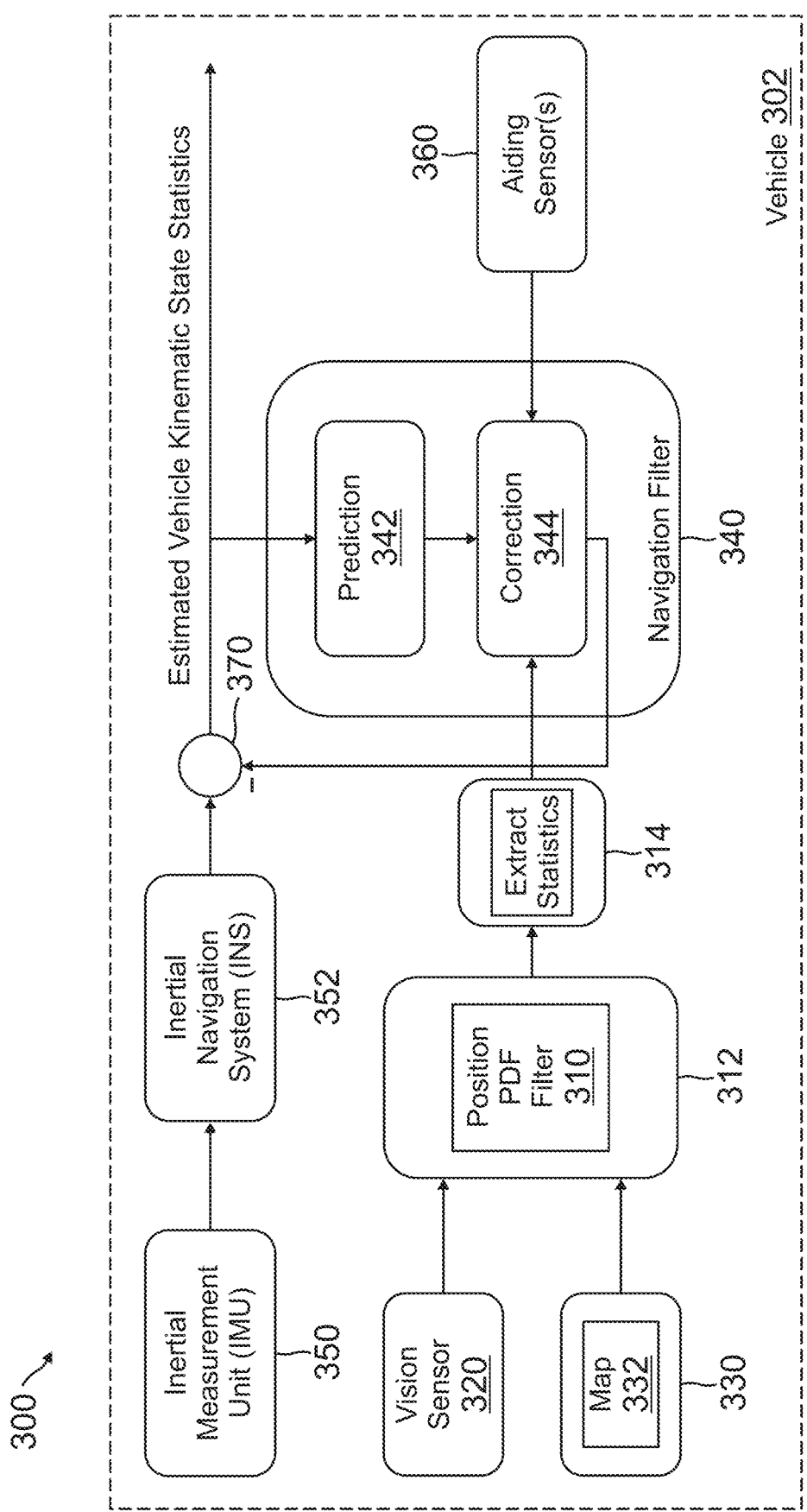
FIG. 3 is a block diagram of a map based, vision navigation system, which is implemented with a position PDF filter, according to an exemplary embodiment.

FIG. 3 illustrates a map based, vision navigation system 300, according to an exemplary embodiment, which can implement the present statistical approach. The navigation system 300 includes a position PDF filter 310, which is implemented in a processor 312 onboard a vehicle 302, such as an aircraft. At least one vision sensor 320, such as a camera, is mounted on vehicle 302. The vision sensor 320 is operative to capture terrain images of a given area over which vehicle 302 traverses. A data storage unit 330 onboard vehicle 302 includes a map database 332 that stores various terrain maps.

The position PDF filter 310 is operative to receive image data from vision sensor 320 through processor 312. The image data corresponds to the terrain images captured by vision sensor 320 of the given area. The position PDF filter 310 is also operative to receive map data from map database 332 through processor 312, with the map data corresponding to a terrain map of the given area.

The position PDF filter 310 is operative to generate statistics of the position and angular orientation of vehicle 302, based on correlation of the image data and map data. The statistics include a mean and variance of the image/map correlation and the variance comprises real-time measurement errors of the position and angular orientation. For example, position PDF filter 310 can perform a correlation between features extracted from a terrain image of a given area, and features in a terrain map of the given area, to estimate the PDF of the position and angular orientation of vehicle 302 relative to the map.

A non-linear filter such as the Fokker-Planck filter can be used to estimate a position PDF from a convolution of a PDF of the image features and a PDF of the map features. Multiple correlation peaks are possible following this convolution given the environment and the number of features. The Fokker-Planck filter can easily handle multiple correlation peaks, and no assumptions are made about the statistics of the PDF. The Fokker-Planck filter is a generalization of a Bayesian filter, which is a predict/correct filter. A Kalman filter is an example of a Bayesian filter under certain assumptions on the state vector and measurement vector statistics. Given a sequence of measurements, the Fokker-Planck filter will usually converge to a single dominant peak.

From the estimated position PDF, the mean and variance of the camera position relative to the map can be extracted. The mean is the measurement and the variance are the measurements error statistics. Further details and examples of how the position PDF filter operates are described hereafter.

The statistics generated by position PDF filter 310 are extracted by a processing unit 314, and sent to a navigation filter 340, such as a Bayesian filter. The navigation filter 340 fuses the extracted statistics from position PDF filter 310 with measurement statistics from other sensors, to estimate the vehicle's position and angular orientation relative to the terrain map. These other sensors include an IMU 350 and one or more aiding sensors 360, which are mounted on vehicle 302. Examples of aiding sensors 360 include a magnetometer, a GNSS receiver such as a Global Positioning System (GPS) receiver, a barometer, or the like. The IMU 350 is operative to produce inertial measurements that are sent to an inertial navigation system (INS) 352, such as a strapdown INS, which is operatively coupled to navigation filter 340.

The INS 352 is configured to generate estimated vehicle kinematic state statistics (including position, velocity, and angular orientation) based on integration of the inertial measurements from IMU 350. However, errors can occur when the inertial measurements are integrated by INS 352, as the IMU 350 can have measurement errors that, when integrated, grow over time. The statistics generated by position PDF filter 310 are used by navigation filter 340 to aid in correction of errors in the estimated vehicle kinematic state statistics.

The navigation filter 340 includes a prediction module 342, and a correction module 344 configured to receive an output from prediction module 342. The prediction module 342 is configured to receive the estimated vehicle kinematic state statistics produced by INS 352. The prediction module 342 is operative to predict a state vector PDF from the estimated vehicle kinematic state statistics. The correction module 344 receives the predicted state vector PDF from prediction module 342. The correction module 344 also receives the extracted statistics from processing unit 314, and sensor measurement statistics from aiding sensors 360. The correction module 344 is configured to generate an error correction signal based on the various received inputs.

The error correction signal is sent from correction module 344 to an input of a subtractor 370, which is also configured to receive an output signal from INS 352. The differential between the signals from correction module 344 and INS 352 is output from subtractor 370 as updated estimated vehicle kinematic state statistics. These updated statistics are sent to other vehicle systems for use in vehicle 302 operations, and also fed back to navigation filter 340 for further processing.

Filtering a Sequence of Images

The measurement PDF, which is the actual position of the camera/vehicle relative to a map, is estimated by a correlation of the image PDF and the map PDF. The measurement PDF often has multiple measurement peaks representing possible positions of the vehicle. The position PDF filter gradually converges to a true measurement peak since the other peaks fluctuate over time. In addition, the correlation of images produces a shift. Thus, correlating the relative position shift and rotation of consecutive images can be done using convolution and the Fast Fourier Transform (FFT). Such a technique is described in Reddy et al., *An FFT-Based Technique for Translation, Rotation, and Scale-Invariant Image Registration*, IEEE Trans. on Image Processing, Vol. 5, pp. 1266-1271 (1996), the disclosure of which is incorporated by reference herein.

A nonlinear filter such as a Fokker-Planck filter can be employed over time to predict and correct a PDF that describes the vehicle position relative to the map. The measurement PDF is fed into the Fokker-Planck filter, which estimates the position PDF over time. The Fokker-Planck filter can be used to incorporate process noise and image translation, as part of the position PDF filter. Bayesian formulas can be used to update the PDF, based on new image measurements. A technique for using the Fokker-Planck filter and a Bayes measurement update is described in Challa et al., *Nonlinear Filter Design Using Fokker-Planck-Kolmogorov Probability Density Evolutions*, IEEE Trans. on Aerospace and Electronic Systems, Vol. 36, No. 1, pp. 309-315 (2000), the disclosure of which is incorporated by reference herein.

As described in Challa et al., a continuous time stochastic dynamic system (SD S) can be described by the following expression:

$$X_t = F(X_t, t) + G(X_t, t)\eta_t \qquad (1)$$

$$t \geq t_0$$

where $X_t = [x_1, x_2, \ldots, x_n]'_t$ represents the state vector of the system at any time t, $F(X_t, t)$ is a linear/nonlinear vector valued function with real components, $G(X_t, t)$ is an n×m real matrix, and $\eta_t$ is a zero-mean, white Gaussian noise process vector having autocorrelation $E[\eta_t \eta_{t'}] = Q_t \delta(t-t')$. Observations $Y_{tk}$ of this system are taken at discrete time instants $t_k$ and the relationship between the state vector of the system of the observations can be described by the following expression:

$$Y_{tk} = H(X_{tk}, t_k) + v_{tk}, k=1,2,\ldots \qquad (2)$$

where $H(X_{tk}, t_k)$ is a linear/nonlinear function of the state vector of the SDS and $v_{tk}$ is a white Gaussian measurement noise vector with covariance matrix $R_{tk}$. It is also assumed that the initial state vector, the process noise vector, and the measurement noise vector are independent. A filter is used to estimate the state vector statistics conditioned on the measurement vector $Y_{tk}$ in a minimum mean square error (MMSE) sense.

Under the assumption that the prior density for the system exists and is once continuously differentiable with respect to t and twice continuously differentiable with respect to $X_t$, it can be shown that, between observations, the conditional density $p\langle X, t | Y^{tk-1}\rangle$ satisfies the Fokker-Planck-Kolmogorov equation (FPKE):

$$\frac{\partial p}{\partial t} = -\sum_{i=1}^{n} \cdot \frac{\partial [pF_i]}{\partial x_i} + \frac{1}{2}\sum_{i=1}^{n} \cdot \sum_{j=1}^{n} \cdot \frac{\partial [p(GQG^T)ij]}{\partial x_i \partial x_j} \qquad (3)$$

$$t_k > t > t_{k-1}$$

where $p\langle X, t | Y^{tk-1}\rangle$, $F_i(X_t, t)$, $G(X, t)$, $Q_t$ are replaced by p, $F_i$, G, and Q, respectively, for the sake of simplicity.

Following an observation at $t_k$ the conditional density satisfies Bayes' formula:

$$p(Y_{tk} | X) = \frac{1}{|2\pi R_{tk}|^{1/2}} e^{-(1/2)[Y_{tk} - H(X_{tk})]^T R_{tk}^{-1} [Y_{tk} - H(X_{tk})]}. \qquad (5)$$

where $Y^{tk} \triangleq \{Y_{tk}, Y^{tk-1}\}$. Equation (4) applies to general PDFs $p(Y_{tk}|X)$ that may have multiple peaks. An example with Gaussian PDF, which has a single peak, would result in $p(Y_{tk}|X)$ being of the form:

$$p(X, t_k | Y^{tk}) = \frac{p(X, t_k | Y^{tk-1}) p(Y_{tk} | X)}{\int p(X, t_k | Y^{tk-1}) p(Y_{tk} | X) dx} \quad (4)$$

Equation (1) can be used to define image motion due to vehicle motion, and governs the time evolution of the position PDF. Equation 2 can be used to define the relationship between the measurement PDF and the predicted PDF. Equations (3) and (4) above are the predictor and corrector equations of the probability density function evolution method, respectively. The mean of the conditional PDF obtained from equation (4) gives the optimal estimated state vector statistics.

Figure 4:
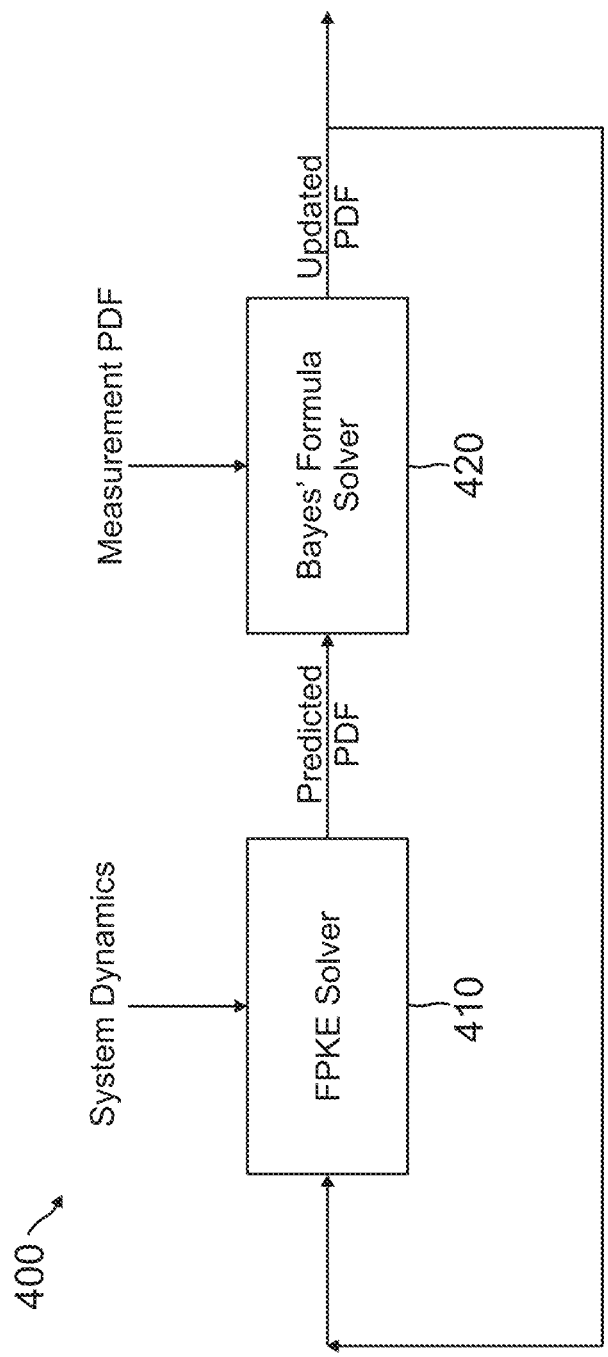
FIG. 4 is a block diagram of an exemplary nonlinear filter, which can be implemented as part of a position PDF filter.

FIG. 4 is a block diagram of a nonlinear filter 400 using the solution methodology presented above with respect to equations (1) to (5), which can be implemented in a position PDF filter of the present navigation system. The nonlinear filter 400 includes a FPKE solver 410 (predictor), which is used in conjunction with a Bayes' formula solver 420 (corrector) to provide optimal estimates for continuous or discrete nonlinear filtering. The FPKE solver 410 is configured to receive system dynamics information, such as a dynamic model that is used to predict the time evolution of the position PDF. The FPKE solver 410 is operative to generate and output a predicted PDF based on the system dynamics information. The Bayes' formula solver 420 is configured to receive the measurement PDF generated by the convolution of the image feature PDF and the map feature PDF. The Bayes' formula solver 420 is also configured to receive the predicted PDF from the FPKE solver 410. The Bayes' formula solver 420 is operative to generate and output a corrected (updated) predicted PDF. The corrected (updated) predicted PDF is also sent to the FPKE solver 410 in a feedback loop. As the FPKE solver 410 is implemented with a partial differential equation, it can be solved using one of the various techniques available for solving such equations.

Position PDF Filter: Update

In the measurement stage, a measurement PDF (PDF_meas) is equal to the convolution (camera and map PDFs), and may have multiple peaks. Although the measurement PDF can have multiple peaks, this is acceptable since the Fokker-Planck filter updates the entire PDF. In the measurement update stage, the position PDF filter update multiplies the state and measurement PDFs.

The convolution could be implemented by sliding a camera image over a map image, and counting the number of overlapping pixels at each shift value. Thus, the pixels between the camera image and the map image will either match or not when the camera image is slid around the map image. The method of sliding the image, one pixel at a time, and comparing pixels at each slide position, is too slow. The same result can be obtained much more efficiently, by noting that multiplication in the frequency domain, is equivalent to convolution in the spatial domain. So, taking the FFT of each image, multiplying them, then taking an inverse FFT, gives the convolution result in one step. An example of a convolution to generate a measurement PDF is shown in FIGS. 5A-5C.

Figure 5C:
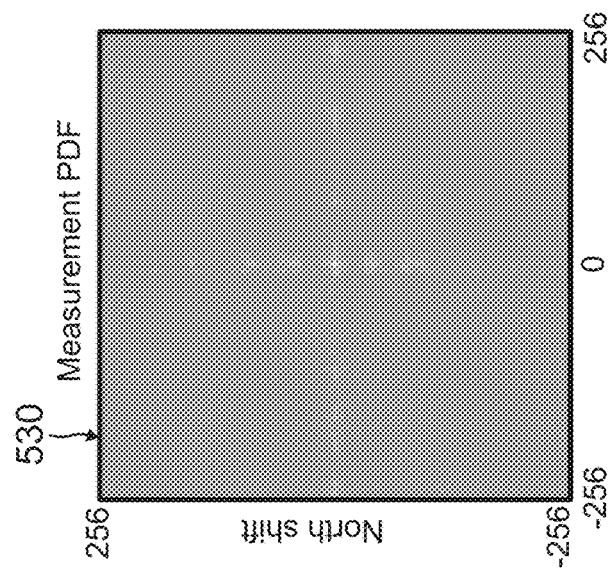
FIG. 5C is a graphical representation of a measurement PDF based on a convolution of a PDF of the camera image of FIG. 5A and a PDF of the map image of FIG. 5B.
Figure 5B:
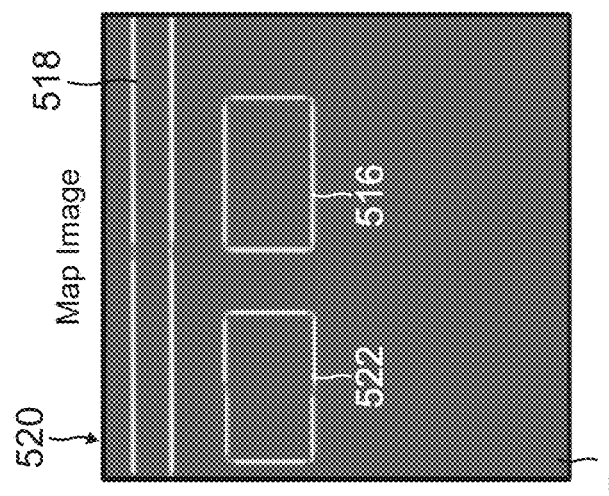
FIG. 5B is a simulated map image of the ground region shown in FIG. 5A.
Figure 5A:
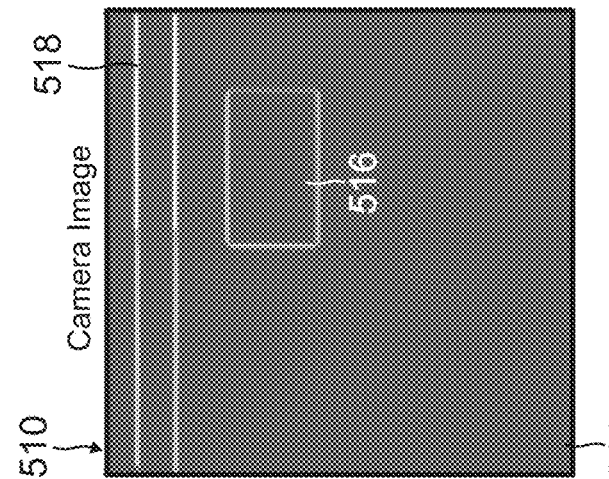
FIG. 5A is a simulated camera image of a ground region.

FIG. 5A is a modeled camera image 510 having 512 by 512 pixels, which shows a ground region 514. The camera image 510 shows the outline edges of a first house 516 by a road 518 (in a binary distribution). FIG. 5B shows a modeled map image 520 having 512 by 512 pixels, which shows the same ground region 514. However, the map image 520 shows the outline edges of the first house 516 and a second house 522 by the road 518 (in a binary distribution). The map image was made at a different time than the camera image, so a different number of houses exist at those two times.

FIG. 5C graphically depicts a measurement PDF 530 based on a convolution of a PDF of the camera image 510 and a PDF of the map image 520 ((PDF meas)=convolution (camera image, map image)). As shown in FIG. 5C, the measurement PDF 530 has multiple peaks, and the center peak has 0 shift [East, North] from the origin of the reference frame. Other peaks occur where the edges of the first house 516 shift to the edges of the second house 522 or the road 518. The highest correlation peak gives the correct shift of the camera image 510 with respect to the map image 520.

Sensor Covariance

A vision sensor such as a camera on a vehicle observes the underlying terrain to produce a camera image, and convolution with map features of the terrain, gives a position measurement. If the terrain has localizable features, then the convolution(camera image, map image) provides the position of the camera, and vehicle, relative to the map. The covariance of the convolution then becomes the covariance matrix, R, of the position measurement. The covariance matrix R along a path through terrain that contains features is time-varying along that path. Some paths will have lower covariance than other paths through the same terrain.

Thus, a covariance matrix R(path(t)) will have a smaller norm, $\Sigma_i \sigma_i(R(path(t_i)))$, for paths that pass over more features. For example, P(path(t)) ellipses, as well as $R_j$(path(t)) ellipses, can be compared for different paths though one map. Any PDF with the same covariance matrix R, will result in the same ellipses with differences in the higher moments of the PDF. In the present approach, the nonlinear filter (e.g., Fokker-Planck filter) allows for making use of the whole PDF, instead of just its mean and covariance.

In an example, a [Z(k), R(k)] ellipse, with center of the ellipse Z and covariance matrix R giving the principle axes of the ellipse, approximates the convolution(camera image, map image). Portions of the SDS (F, B, Q, and H) can be constant, but an R(k) matrix is generated from the convolution(camera image, map image) and varies as the camera travels over the terrain. The dynamic model is x(k)=F*x(k−1)+B*u(k)+G*w(k) with a four dimensional state vector, with East and North position (E and N) and East and North velocity (E_dot and N_dot) x'=[E N; E_dot N_dot] with dynamic matrix F=[I, I*dt; 0, I], and process noise covariance matrix=Q. The measurement model is y(k)=H*x(k)+v(k) with measurement noise covariance matrix R(k) which forms 2D edge-pixel ellipses and H=[I, 0].

In a predict step:

x(k,k−1)=F*x(k−1,k−1)+B*u(k), where F moves the ellipse-center of the state covariance matrix P in the velocity direction; and P(k,k−1)=F*P(k−1,k−1)*F'+G'*Q*G, where Q expands the P ellipse.

In an update step:

z(k)=y(k)−H*x(k), and if this error is small, then the correction to x will be small;

S(k)=H*P(k,k−1)*H'+R(k), with R(k) being large if there are no features, and the semi-major-axis>>the semi-minor-axis near line features;

K(k)=P(k,k−1)*H'*inv(S(k)), so inv(S(k)) and K(k) are very small when there are no features;

x(k,k)=x(k,k−1)+K(k)*y(k), so x(k,k) is nearly x(k,k−1) when there are no features;

P(k,k)=(I−K(k)*H)*P(k,k−1)*(I−K(k)*H)'+K(k)*R(k)*K(k)', so P(k,k) is nearly P(k,k−1) when there are no features.

Figure 6B:
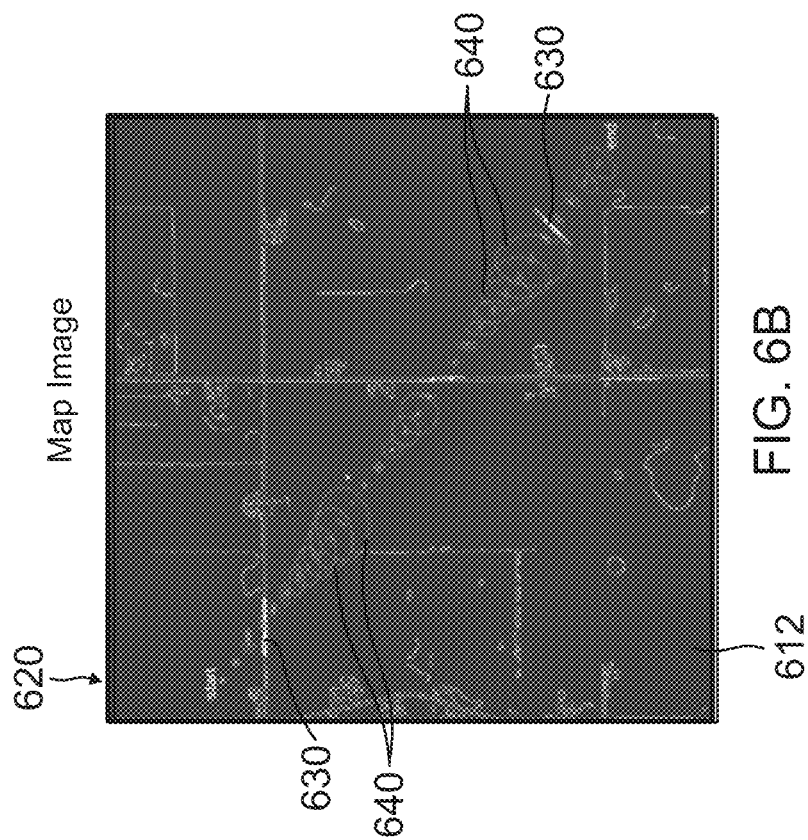
FIG. 6B is a map image of the rural area of FIG. 6A, with the map image showing vehicle position measurements computed from correlated images in the form of ellipses, where the center of each ellipse is the measurement mean vector and the ellipse shape and size represent measurement uncertainty.
Figure 6A:
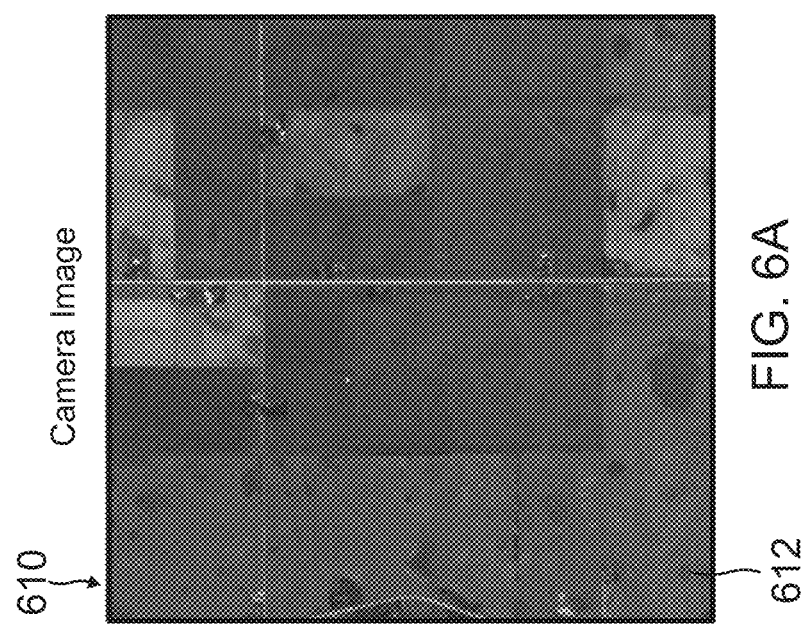
FIG. 6A is a camera image of a rural area.

An example resulting from the computation of a [z(k), R(k)] ellipse is shown in FIGS. 6A and 6B. FIG. 6A is a camera image 610 with a 1024 by 1024 pixel resolution, showing a rural area 612. FIG. 6B is a map image 620 of the same rural area 612, showing vehicle path points. The map image 620 shows vehicle position measurements computed from correlated images in the form of ellipses, where the center of each ellipse is the measurement mean vector and the ellipse shape and size represent measurement uncertainty.

A depicted in FIG. 6B, a set of R(k) ellipses 630 are plotted, and a series of P(k) ellipses 640 are plotted, along the same vehicle path on map image 620. The R(k) ellipses 630 approximate the shape of image pixels near the vehicle, and the P(k) ellipses 640 represent the shapes of the region that contain the estimates of the vehicle's position. The center of each P(k) ellipse 640 is the current best estimate of the vehicle's position at the corresponding time, while the shape and size of each P(k) ellipse 640 corresponds to the level of uncertainty in the vehicle's position.

The [z(k), R(k)] ellipse is computed from the convolution (camera image, map image) in a 64-by-64 square near the vehicle location at time k, where R is the covariance matrix of the convolution(camera image, map image) in the n-by-n square near the vehicle. If the n-by-n square is empty for some time k, then there is no measurement, so the matrix R(k) is large, inv(S(k))=0, K(k)=0, and the filter continues to predict the state vector statistics without a measurement update. The paths are made by plotting the covariance matrix R(k) from the convolution(camera image, map image) at the path location at time k. When the n-by-n square is empty, the covariance matrix R(k) is not plotted.

As mentioned above, the R(k) ellipses 630 and the P(k) ellipses 640 are plotted along the same path on map image 620 in FIG. 6B. Thus, the measurement PDF [z(k),R(k)] =convolution(camera image, map image). The posterior state PDF [x(k,k),P(k,k)] combines the measurement vector PDF [z(k),R(k)] with the prior state vector PDF [x(k,k−1), P(k,k−1)] using the SDS modeled using the matrices [F, G, Q, H].

This example uses 64×64 segments of the map image 620 for portions of the map under the vehicle's flight trajectory and its 64×64 pixel camera. The moments [z(k),R(k)] give the ellipse that is best fit to the measurement PDF. If the camera image 610 is equal to the shifted map image 620, then the measurement PDF is a single point at that [East, North] shift value. If the camera image 610 and the map image 620 both contain a single line segment (e.g., a road), then the measurement PDF is a line segment. The Kalman filter updates the prior state vector PDF [x(k,k−1),P(k,k−1)] using the measurement vector PDF=[z(k),R(k)] and the measurement matrix H. Between measurements, the state vector PDF statistics [x(k),P(k)] are predicted forward in time using the SDS model matrices [F,G,Q] so that the mean vector moves and the state covariance matrix grows.

State Vector PDF and Measurement Vector PDF

The state vector PDF gives the location and shape of the region of the vehicle's most likely location. The measurement vector PDF is the convolution(camera image, map image). The measurement vector PDF is a single shift point if the camera image is equal to the shifted map image. The measurement vector PDF is an ellipse if the camera image is a blurry approximation of the map image. In this case, the measurement vector PDF has wide peaks, so the corresponding covariance matrix is large. The measurement vector PDF is a line segment if the camera image and map image both have a single line. The measurement vector PDF has m peaks if the camera and map images have m parallel lines (e.g., from roads or buildings). The measurement vector PDF is undefined, if the camera image is empty (e.g., over water with no features).

When the convolution is done in the frequency domain, there is a runtime of O(N*log(N)) for N pixels in each image.

Bayesian filters can be used to predict the state vector PDF, using model matrices and process noise vector statistics. The Bayesian filters update the predicted, or prior, state vector PDF, by multiplying the current state PDF and measurement PDF, and then normalizing. A Gaussian example is given as follows.

The state vector PDF is represented by the expression:

$$p(x) = \frac{1}{\|(2\pi)^n P\|^{\frac{1}{2}}} e^{-\frac{1}{2}(x-x_0)^T P^{-1}(x-x_0)},$$

where $x_0$ is the mean vector of the state PDF.

The measurement vector PDF is represented by the expression:

$$p_{meas}(x) = \frac{1}{\|(2\pi)^n R(k)\|^{1/2}} e^{-\frac{1}{2}(y-Hx)^T (R(k))^{-1}(y-Hx)}$$

The state vector PDF is updated by multiplying the state vector PDF and the measurement vector PDF, then normalizing, as follows:

$$p_{new}(x) = p(x) * p_{meas}(x) = c * e^{-\frac{1}{2}[(x-x_0)^T P^{-1}(x-x_0)+(y-Hx)^T (R(k))^{-1}(y-Hx)]}$$

$$\text{where } c = \frac{1}{\|(2\pi)^n P\|^{\frac{1}{2}} \|(2\pi)^n R(k)\|^{1/2}}$$

Consider a generalized form of $$p_{new}(x):p_{new}(x) = c * e^{-\frac{1}{2}[(x-x_{0\_new})^T P_{new}^{-1}(x-x_{0\_new})]}.$$

By comparing the two equations for $p_{new}(x)$ and equating coefficients, $P_{new}^{-1} = P^{-1} + H^T(R(k))^{-1}H$. Since information is the inverse of covariance, this expression shows that the new information is the sum of the predicted, or prior, information and the measurement information. The notation can be updated to x(k,k), x(k,k−1), P(k,k−1), P(k,k), etc.

FIGS. 7A and 7B are example plots of updated state vector PDFs, which are described further as follows.

Linear Dynamics and Gaussian PDFs

FIG. 7A is an example plot 710 with Gaussian PDFs, in which the updated state vector PDF is equal to the predicted state vector PDF multiplied by the measurement vector PDF, and then normalized. In a linear model:

$$\frac{dx}{dt} = Fx + Gw, \ y = Hx + v, \ Q = \text{cov}(w), \ R = \text{cov}(v).$$

The state vector PDF is represented by the expression:

$$p = \frac{1}{\|(2\pi)^n P\|^{1/2}} e^{-\frac{1}{2}(x-x_0)^T P^{-1}(x-x_0)}.$$

The measurement vector PDF is represented by the expression:

$$p_{meas} = \frac{1}{\|(2\pi)^n R(k)\|^{1/2}} e^{-\frac{1}{2}(y-Hx)^T (R(k))^{-1}(y-Hx)}$$

In FIG. 7A, the plot 710 shows the predicted, or prior, state vector PDF, the measurement vector PDF, and the updated, or posterior, state vector PDF. The measurement vector PDF uses the [z, R] ellipses as the first two moments of $p_{meas}$. FIG. 7A shows that either the Kalman filter equations or the direct Bayesian filter equations can be used to update the state vector PDF. In the case of Gaussian distributions, the Kalman filter equations are more efficient than multiplying PDFs in the direct Bayesian filter equations. But for general non-Gaussian PDFs, the direct Bayesian filter equations have to be used to update the predicted state vector PDF.

Nonlinear Dynamics and General PDFs

FIG. 7B is an example plot 720 with general (non-Gaussian) PDFs and the direct Bayesian filter equations, in which the updated state vector PDF is computed by multiplying the predicted state vector PDF by the measurement vector PDF, and then normalizing. In a nonlinear model:

$$\frac{dx}{dt} = f(x) + g(x)w, \ pdf(y) = p_{meas}$$

To predict the state vector PDF:

$$\frac{dp}{dt} = -\nabla^T (p*f) + \frac{1}{2}\nabla^T (gQg^T)\nabla p.$$

To update the state vector PDF: $p(x)=p(x)*p_{meas}(x)$, which is then normalized.

In FIG. 7B, the plot 720 depicts a general PDF for $p_{meas}$. The plot 720 shows that for arbitrary PDFs, the updated state vector PDF can be computed by multiplying the predicted state vector PDF and the measurement vector PDF.

The Fokker-Planck equation predicts and updates the general state vector PDF, using nonlinear models, and a general measurement vector PDF. In a nonlinear dynamic model:

$$\frac{dx}{dt} = f(t, x) + g(t, x)w$$

where $x \in R^n$ and w is a Gaussian noise vector with covariance Q. The state vector PDF is p(x,t), which is predicted forward in time using the expression:

$$\frac{dp}{dt} = -\nabla^T (p*f) + \frac{1}{2}\nabla^T (gQg^T)\nabla p$$

where $-\nabla^T(p*f)$ is drift, and $$\frac{1}{2}\nabla^T (gQg^T)\nabla$$

p is diffusion. The measurement vector PDF is $p_{meas}(x,t)$ where $p_{meas}$=convolution(camera image, map image). The update of the predicted state vector PDF is computed using the expression:

$$p(x, t\mid y(k)) = \frac{p(x, t\mid y(k-1)) * p_{meas}(t, y(k-1)\mid x)}{\sum_x [p(x, t\mid y(k-1)) * p_{meas}(t, y(k-1)\mid x)]}$$

where p(x, t|y(k−1)) is the predicted state vector PDF and $p_{meas}$(t, y(k−1)|x) is the measurement vector PDF.

Implementation of Fokker-Planck Filter Along Path in Map Image

The Fokker-Planck filter can be implemented along any path in a map image, since the Fokker-Planck filter can use any measurement vector PDF including a PDF that has multiple peaks. The state vector PDF is any positive function that sums to 1. In this case, the state vector PDF is an N×N image, which is predicted and corrected by the Fokker-Planck equations. The measurement vector PDF is any positive function that sums to 1. The Fokker-Planck filter provides the general measurement PDF, by the convolution of the camera image with the map image $p_{meas}(x)$=convolution($cam_{image}$, $map_{image}$) where $p_{meas}(x)$ is an N×N image with multiple peaks.

Fokker-Planck Filter with Camera Measurements Along Path in Map Image

Figure 8:
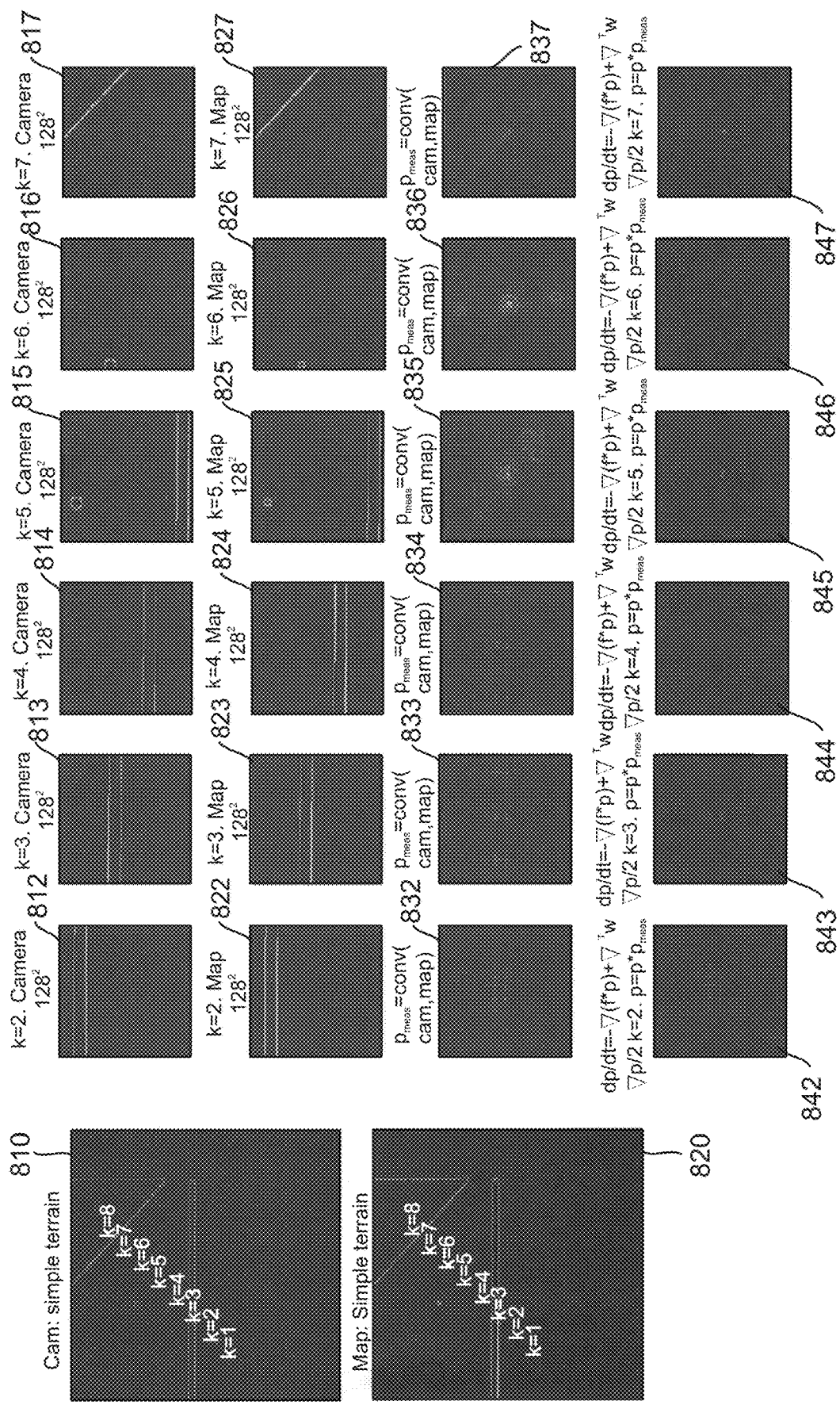
FIG. 8 is an example simulation of the operation of a position PDF filter for a vehicle traveling along a path over a simple terrain.
Figure 9:
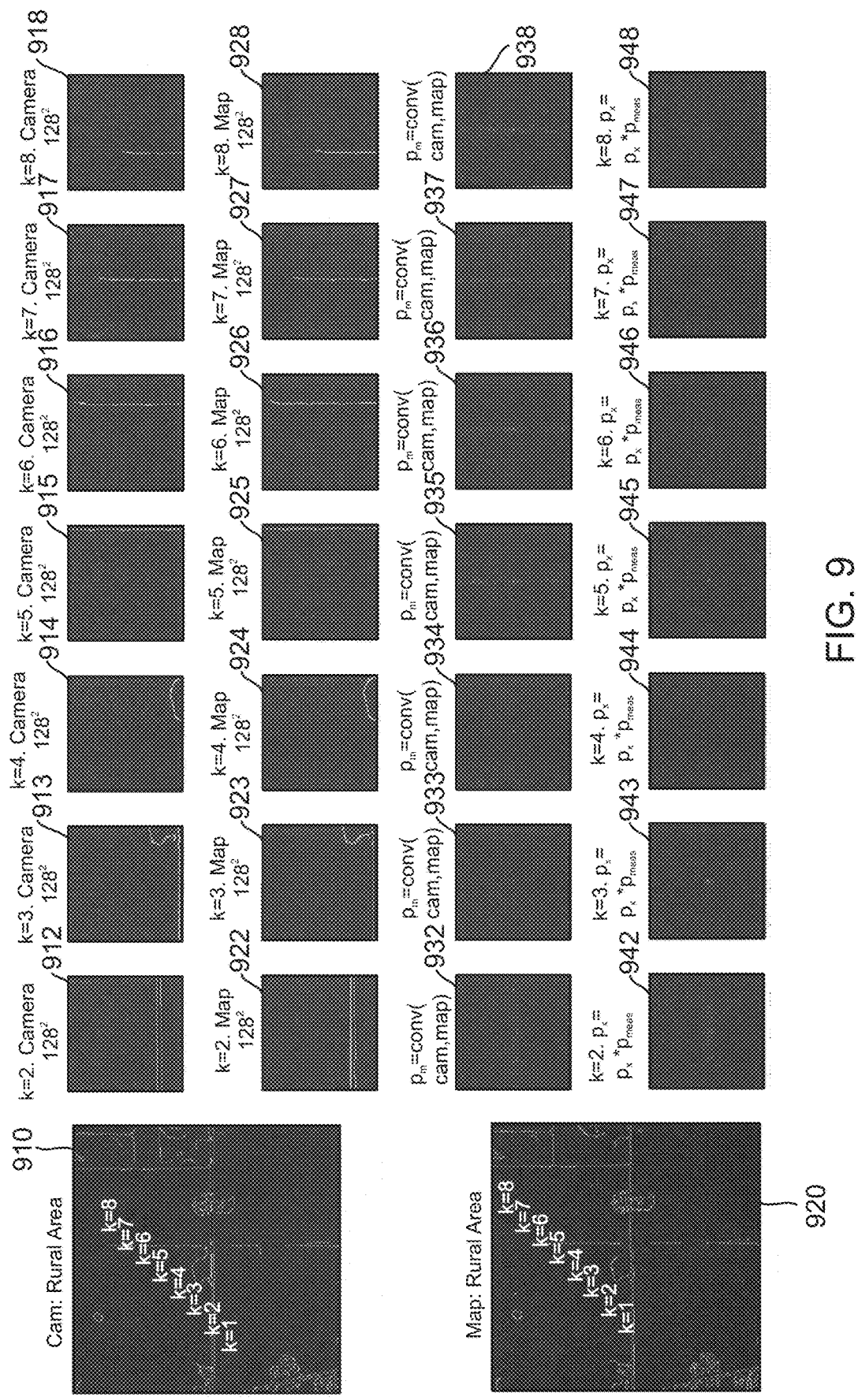
FIG. 9 is an example simulation of the operation of a position PDF filter for a vehicle traveling along a path over a rural area.

FIGS. 8 and 9 show example simulations of the operation of a position PDF filter for a vehicle traveling along a path, which uses a Fokker-Planck filter to process camera and map images. These simulations used an evolving 128×128 pixel state vector PDF for each step along the path, where dx/dx=f(x)+bu+gw was used to predict the vehicle state vector PDF forward in time. Fourier transforms of the camera image and map image were then performed to efficiently compute the convolution of the camera and map images and to compute the measurement vector PDF.

In these examples, a vehicle follows a two-dimensional path: $x(t_k)$=[East($t_k$); North($t_k$)]. Initially, the state vector PDF starts with multiple peaks representing different possible vehicle positions. The prediction step uses f, g, Q from the nonlinear model. The update step uses the measurement vector PDF computed from the convolution of camera and map images to update the predicted state vector PDF and compute the updated state vector PDF. The update step of the Fokker-Planck filter reduces the secondary peaks in the state vector PDF over time.

The simulation of FIG. 8 used a camera image 810 of a simple terrain, and a map image 820 of the simple terrain, where k=measurement times (e.g., 1 second for frame rate of camera) for each step along the path. In particular, for k=2 to k=7, the first (top) row of plots 812, 813, 814, 815, 816, 817 show features extracted from camera image 810, and the second row of plots 822, 823, 824, 825, 826, 827 show features extracted from map image 820. The third row of plots 832, 833, 834, 835, 836, 837 is the measurement PDF, which is determined by the convolution of the camera image (first row) and map image (second row) at a given time (k=2, k=3, etc.). The plots of the measurement PDF have lines if the camera image and map image have lines. The fourth (bottom) row of plots 842, 843, 844, 845, 846, 847 is the updated state vector PDF computed by the Fokker-Planck filter. The plots of the updated state vector PDF start with multiple peaks (plot 842), but converge to a single-peak updated state vector PDF (plot 847). The mean vector and state covariance matrix are extracted as statistics from the fourth row of plots—the updated state vector PDF, and would be fed to the navigation filter in the present system. The mean vector corresponds to the camera measurement, and the state covariance matrix is the error of the vehicle position relative to the map.

For example, plot 832 shows the convolution of plot 812 and plot 822 at k=2. The large number of white dots in plot 832 means that the measurement vector has many peaks, such that there is a lot of ways to match features between the camera image and map image when shifted left or right. The plot 842 (output of Fokker-Planck filter) is the updated position vector PDF based on the measurement vector PDF from plot 832. This process repeats itself for each measurement time (k=3, k=4, etc.) to provide an updated position vector PDF at each time. As the process proceeds, more information is obtained at each measurement time, so many of the earlier correlation peaks are reduced.

The simulation of FIG. 9 used a camera image 910 of a rural area, and a map image 920 of the rural area, where k=measurement times (e.g., 1 second for frame rate of camera) for each step along the path. In particular, for k=2 to k=8, the first row of plots 912, 913, 914, 915, 916, 917, 918 show features extracted from camera image 910, and the second row of plots 922, 923, 924, 925, 926, 927, 928 show features extracted from map image 920. The third row of plots 932, 933, 934, 935, 936, 937, 938 is the measurement PDF, which is determined by the convolution of the camera image (first row) and map image (second row) at a given time (k=2, k=3, etc.). The fourth row of plots 942, 943, 944, 945, 946, 947, 948 is the updated state vector PDF computed by the Fokker-Planck filter. The plots of the updated state vector PDF start with multiple peaks (plot 942), but converge to a single-peak updated state vector PDF (plot 948). The mean vector and state covariance matrix are extracted as statistics from the fourth row of plots—the updated state vector PDF, and would be fed to the navigation filter in the present system.

For example, plot 932 shows the convolution of plot 912 and plot 922 at k=2. The plot 942 (output of Fokker-Planck filter) is the updated position vector PDF based on the measurement vector PDF from plot 932. This process repeats itself for each measurement time (k=3, k=4, etc.) to provide an updated position vector PDF at each time. As the process proceeds, more information is obtained at each measurement time, so many of the earlier correlation peaks are reduced.

Actual Flight Path Example

Figure 10:
FIG. 10 is a map a suburban area that shows a flight path for an aircraft implemented with a position PDF filter for navigation.

FIGS. 10-13 relate to an actual flight path example of the present approach, in which an aircraft was flown over a suburban area (Sun Lakes, Ariz.). FIG. 10 is a map 1010 (from Google Earth) of the suburban area and shows a flight path 1020 for the aircraft, which had a flight direction of North by North-West. As the aircraft was flying, a camera on the aircraft captured images of the underlying area and an onboard computer processed the images at about one frame per second. The position PDF filter operated on the post-processed data, and provided updates based on the image capture rate and the computer computation speed.

FIGS. 11A-11D show edge images that were obtained using an edge detector, based on actual images captured by the camera on the aircraft along flight path 1020. In particular, a first row of camera edge images 1112, 1113, 1114, 1115, 1116, 1117, 1118, 1119 show edge features that were extracted from the camera images, and a second row of map edge images 1122, 1123, 1124, 1125, 1126, 1127, 1128, 1129 show features that were extracted from the corresponding map images. A third row of plots 1132, 1133, 1134, 1135, 1136, 1137, 1138, 1139 are the measurement vector PDFs, which were determined by the convolution of the camera edge images (first row) and the map edge images (second row) at a given time (k=2, k=3, etc.). A fourth row of plots 1142, 1143, 1144, 1145, 1146, 1147, 1148, 1149 are the updated position vector PDFs that were output by a Fokker-Planck filter. The plots of the position vector PDF start with multiple peaks (plot 1142, FIG. 11A), but converge to a single-peak estimated-position solution (plot 1149, FIG. 11D). The mean vector and state covariance matrix were extracted as statistics from the fourth row of plots in FIGS. 11A-11D, and were output as real-time measurement mean vectors and their errors to the navigation filter in the aircraft.

Figures 12A, 12B:
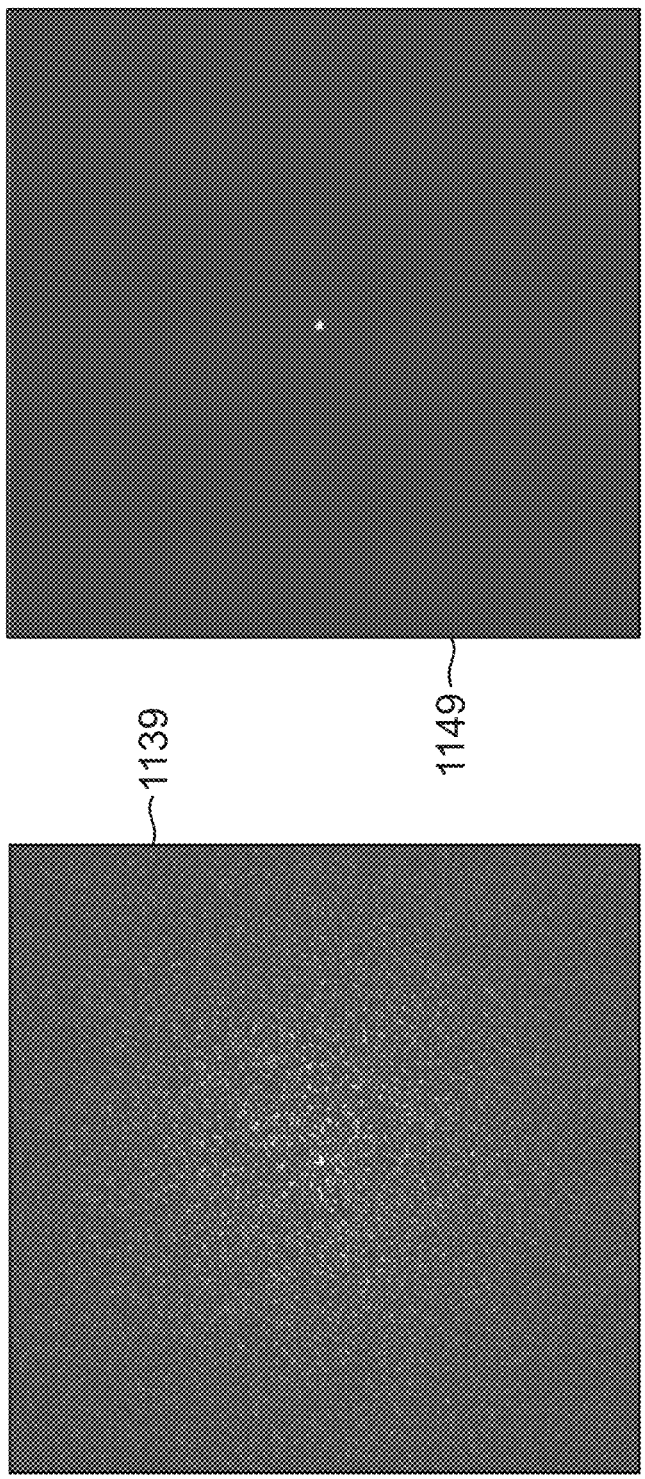
FIGS. 12A and 12B respectively show enlarged views of the measurement vector PDF and the updated position vector PDF at the last time step from FIG. 11D.

FIGS. 12A and 12B respectively show enlarged views of the measurement vector PDF and the updated position vector PDF at the last time step (from plots 1139 and 1149 in FIG. 11D). The standard deviation of the measurement vector PDF was 20 times greater than the standard deviation of the updated position vector PDF.

Figures 13A, 13B:
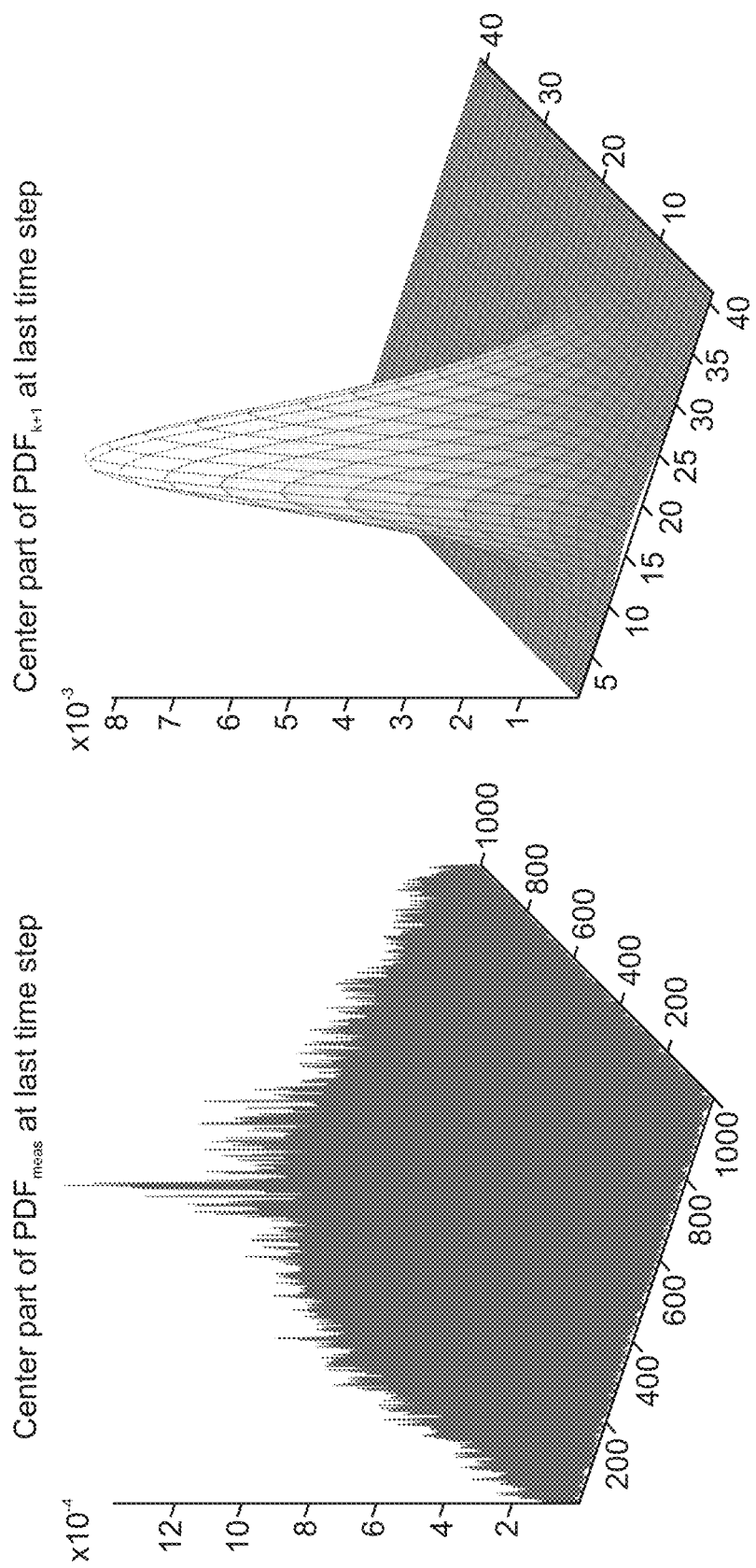
FIGS. 13A and 13B respectively show graphical representations of the center part of the measurement vector PDF and the updated position vector PDF from FIGS. 12A and 12B.

FIGS. 13A and 13B respectively show graphical representations of the center part of the measurement vector PDF ($PDF_{meas}$) and the updated position vector PDF ($PDF_{k+1}$), from FIGS. 12A and 12B, at the last time step.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a navigation system, comprising: a plurality of sensors onboard a vehicle, the sensors including at least one vision sensor; a data storage unit onboard the vehicle, the data storage unit including a map database comprising one or more terrain maps; and a processor onboard the vehicle, the processor operatively coupled to the sensors and the data storage unit, the processor including a position probability density function (PDF) filter, wherein the position PDF filter is operative to perform a method comprising: receiving image data from the at least one vision sensor, the image data corresponding to one or more terrain images, captured by the vision sensor, of a given area; receiving map data from the map database, the map data corresponding to a terrain map of the given area; generating a first PDF of one or more image features available in the image data; generating a second PDF of one or more map features available in the map data; generating a measurement vector PDF by a convolution of the first PDF and the second PDF; estimating a position vector PDF using a non-linear filter that receives the measurement vector PDF; and generating statistics from the estimated position vector PDF, the statistics including real-time measurement errors of position and angular orientation of the vehicle.

Example 2 includes the navigation system of Example 1, wherein the non-linear filter comprises a Fokker-Planck filter.

Example 3 includes the navigation system of any of Examples 1-2, wherein the position PDF filter performs a correlation between the one or more image features in the image data and the one or more map features in the map data, to estimate position vector statistics of the vehicle relative to the terrain map.

Example 4 includes the navigation system of Example 3, wherein the statistics include a mean vector and state covariance matrix of the correlation.

Example 5 includes the navigation system of any of Examples 1-4, wherein the at least one vision sensor comprises a camera mounted on the vehicle and operative to capture the one or more terrain images of the given area.

Example 6 includes the navigation system of any of Examples 1-5, wherein the sensors further include: an inertial measurement unit (IMU) operative to produce inertial measurements for the vehicle; and one or more aiding sensors.

Example 7 includes the navigation system of Example 6, wherein the one or more aiding sensors comprise a Global Navigation Satellite System (GNSS) receiver, a barometer, or a magnetometer.

Example 8 includes the navigation system of any of Examples 6-7, further comprising: a processing unit operative to receive an output from the position PDF filter; and a navigation filter operative to receive an output from the processing unit; wherein the statistics of the estimated position vector PDF computed from the position PDF filter are extracted by the processing unit and sent to the navigation filter.

Example 9 includes the navigation system of Example 8, further comprising: an inertial navigation system (INS) operatively coupled to the navigation filter; wherein the INS is operative to receive the inertial measurements from the IMU, and generate estimated kinematic state statistics for the vehicle.

Example 10 includes the navigation system of Example 9, wherein the navigation filter comprises a Bayesian filter and includes: a prediction module operative to receive the estimated kinematic state statistics for the vehicle; and a correction module configured to receive an output from the prediction module, the correction module also configured to receive the extracted statistics from the processing unit and sensor measurement statistics from the one or more aiding sensors; wherein the navigation filter is operative to fuse the extracted statistics of the position vector PDF with the sensor measurement statistics, to estimate the position and angular orientation of the vehicle relative to the terrain map, and to aid in correction of errors in the estimated vehicle kinematic state statistics for the vehicle.

Example 11 includes the navigation system of Example 10, wherein the correction module is configured to send an output signal to a subtractor, which is also configured to receive an output signal from the INS.

Example 12 includes the navigation system of Example 11, wherein a differential signal between the output signals from the correction module and the INS is output from the subtractor as updated estimated vehicle kinematic state statistics, which are sent to other systems for further use in vehicle operation, and also fed back to the prediction module of the navigation filter.

Example 13 includes the navigation system of any of Examples 1-12, wherein the vehicle is an aircraft.

Example 14 includes the navigation system of any of Examples 1-13, wherein the vehicle is an unmanned aerial vehicle.

Example 15 includes a method of navigating a vehicle with a map based, vision navigation system, the method comprising: capturing one or more terrain images of a given area over which the vehicle is traversing, the terrain images captured with at least one vision sensor onboard the vehicle; sending image data from the at least one vision sensor to a position probability density function (PDF) filter implemented in a processor onboard the vehicle, the image data corresponding to the one or more terrain images; sending map data from a map database onboard the vehicle to the position PDF filter, the map data corresponding to a terrain map of the given area; wherein the position PDF filter performs a method comprising: generating a first PDF of one or more image features available in the image data; generating a second PDF of one or more map features available in the map data; generating a measurement vector PDF by a convolution of the first PDF and the second PDF; estimating a position vector PDF using a non-linear filter that receives the measurement vector PDF; and generating statistics from the estimated position vector PDF, the statistics including real-time measurement errors of position and angular orientation of the vehicle; extracting the statistics from the position PDF filter; and sending the extracted statistics to a navigation filter onboard the vehicle.

Example 16 includes the method of Example 15, wherein the non-linear filter comprises a Fokker-Planck filter.

Example 17 includes the method of any of Examples 15-16, wherein: the position PDF filter performs a correlation between the one or more image features in the image data and the one or more map features in the map data, to estimate position vector statistics of the vehicle relative to the terrain map; and the statistics include a mean vector and state covariance matrix of the correlation.

Example 18 includes the method of any of Examples 15-17, wherein the navigation filter fuses the extracted statistics with other sensor measurement statistics from other sensors onboard the vehicle, to estimate a position and angular orientation of the vehicle relative to the terrain map, and to aid in correction of errors in estimated vehicle kinematic state statistics for the vehicle.

Example 19 includes the method of Example 18, further comprising: obtaining inertial measurements for the vehicle from an onboard inertial measurement unit (IMU); sending the inertial measurements to an onboard inertial navigation system (INS) operatively coupled to the navigation filter; wherein the INS is operative to generate the estimated kinematic state statistics for the vehicle.

Example 20 includes the method of Example 19, wherein the navigation filter comprises a Bayesian filter and includes: a prediction module that receives the estimated kinematic state statistics for the vehicle; and a correction module that receives an output from the prediction module, the extracted statistics from the position PDF filter, and the other sensor measurement statistics from the other sensors.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A navigation system, comprising:
   a plurality of sensors onboard a vehicle, the sensors including at least one vision sensor;
   a data storage unit onboard the vehicle, the data storage unit including a map database comprising one or more terrain maps; and
   a processer onboard the vehicle, the processor operatively coupled to the sensors and the data storage unit, the processor including a position probability density function (PDF) filter, wherein the position PDF filter is operative to perform a method comprising:
      receiving image data from the at least one vision sensor, the image data corresponding to one or more terrain images, captured by the vision sensor, of a given area;
      receiving map data from the map database, the map data corresponding to a terrain map of the given area;
      generating a first PDF of one or more image features available in the image data;
      generating a second PDF of one or more map features available in the map data;
      generating a measurement vector PDF by a convolution of the first PDF and the second PDF;
      estimating a position vector PDF using a non-linear filter that receives the measurement vector PDF; and
      generating statistics from the estimated position vector PDF, the statistics including real-time measurement errors of position and angular orientation of the vehicle.

2. The navigation system of claim 1, wherein the non-linear filter comprises a Fokker-Planck filter.

3. The navigation system of claim 1, wherein the position PDF filter performs a correlation between the one or more image features in the image data and the one or more map features in the map data, to estimate position vector statistics of the vehicle relative to the terrain map.

4. The navigation system of claim 3, wherein the statistics include a mean vector and state covariance matrix of the correlation.

5. The navigation system of claim 1, wherein the at least one vision sensor comprises a camera mounted on the vehicle and operative to capture the one or more terrain images of the given area.

6. The navigation system of claim 1, wherein the sensors further include:
   an inertial measurement unit (IMU) operative to produce inertial measurements for the vehicle; and
   one or more aiding sensors.

7. The navigation system of claim 6, wherein the one or more aiding sensors comprise a Global Navigation Satellite System (GNSS) receiver, a barometer, or a magnetometer.

8. The navigation system of claim 6, further comprising:
   a processing unit operative to receive an output from the position PDF filter; and
   a navigation filter operative to receive an output from the processing unit;
   wherein the statistics of the estimated position vector PDF computed from the position PDF filter are extracted by the processing unit and sent to the navigation filter.

9. The navigation system of claim 8, further comprising:
   an inertial navigation system (INS) operatively coupled to the navigation filter;
   wherein the INS is operative to receive the inertial measurements from the IMU, and generate estimated kinematic state statistics for the vehicle.

10. The navigation system of claim 9, wherein the navigation filter comprises a Bayesian filter and includes:
    a prediction module operative to receive the estimated kinematic state statistics for the vehicle; and
    a correction module configured to receive an output from the prediction module, the correction module also configured to receive the extracted statistics from the processing unit and sensor measurement statistics from the one or more aiding sensors;
    wherein the navigation filter is operative to fuse the extracted statistics of the position vector PDF with the sensor measurement statistics, to estimate the position and angular orientation of the vehicle relative to the terrain map, and to aid in correction of errors in the estimated vehicle kinematic state statistics for the vehicle.

11. The navigation system of claim 10, wherein the correction module is configured to send an output signal to a subtractor, which is also configured to receive an output signal from the INS.

12. The navigation system of claim 11, wherein a differential signal between the output signals from the correction module and the INS is output from the subtractor as updated estimated vehicle kinematic state statistics, which are sent to other systems for further use in vehicle operation, and also fed back to the prediction module of the navigation filter.

13. The navigation system of claim 1, wherein the vehicle is an aircraft.

14. The navigation system of claim 1, wherein the vehicle is an unmanned aerial vehicle.

15. A method of navigating a vehicle with a map based, vision navigation system, the method comprising:
capturing one or more terrain images of a given area over which the vehicle is traversing, the terrain images captured with at least one vision sensor onboard the vehicle;
sending image data from the at least one vision sensor to a position probability density function (PDF) filter implemented in a processor onboard the vehicle, the image data corresponding to the one or more terrain images;
sending map data from a map database onboard the vehicle to the position PDF filter, the map data corresponding to a terrain map of the given area;
wherein the position PDF filter performs a method comprising:
generating a first PDF of one or more image features available in the image data;
generating a second PDF of one or more map features available in the map data;
generating a measurement vector PDF by a convolution of the first PDF and the second PDF;
estimating a position vector PDF using a non-linear filter that receives the measurement vector PDF; and
generating statistics from the estimated position vector PDF, the statistics including real-time measurement errors of position and angular orientation of the vehicle;
extracting the statistics from the position PDF filter; and
sending the extracted statistics to a navigation filter onboard the vehicle.

16. The method of claim 15, wherein the non-linear filter comprises a Fokker-Planck filter.

17. The method of claim 15, wherein:
the position PDF filter performs a correlation between the one or more image features in the image data and the one or more map features in the map data, to estimate position vector statistics of the vehicle relative to the terrain map; and
the statistics include a mean vector and state covariance matrix of the correlation.

18. The method of claim 15, wherein the navigation filter fuses the extracted statistics with other sensor measurement statistics from other sensors onboard the vehicle, to estimate a position and angular orientation of the vehicle relative to the terrain map, and to aid in correction of errors in estimated vehicle kinematic state statistics for the vehicle.

19. The method of claim 18, further comprising:
obtaining inertial measurements for the vehicle from an onboard inertial measurement unit (IMU);
sending the inertial measurements to an onboard inertial navigation system (INS) operatively coupled to the navigation filter;
wherein the INS is operative to generate the estimated kinematic state statistics for the vehicle.

20. The method of claim 19, wherein the navigation filter comprises a Bayesian filter and includes:
a prediction module that receives the estimated kinematic state statistics for the vehicle; and
a correction module that receives an output from the prediction module, the extracted statistics from the position PDF filter, and the other sensor measurement statistics from the other sensors.

* * * * *